(12) United States Patent
Tashiro

(10) Patent No.: US 12,440,783 B2
(45) Date of Patent: Oct. 14, 2025

(54) VORTEX FLOW DEVICE FOR REMOVING FOREIGN MATTER FROM A LIQUID

(71) Applicant: Bunri Incorporation, Tokyo (JP)

(72) Inventor: Makoto Tashiro, Tokyo (JP)

(73) Assignee: BUNRI INCORPORATION, Tokyo (JP)

( * ) Notice: Subject to any disclaimer, the term of this patent is extended or adjusted under 35 U.S.C. 154(b) by 392 days.

(21) Appl. No.: 17/993,780

(22) Filed: Nov. 23, 2022

(65) Prior Publication Data

US 2023/0086777 A1 Mar. 23, 2023

Related U.S. Application Data

(63) Continuation of application No. PCT/JP2021/048111, filed on Dec. 24, 2021.

(51) Int. Cl.
| | |
|---|---|
| *B01D 21/26* | (2006.01) |
| *B01D 21/00* | (2006.01) |
| *B01D 21/02* | (2006.01) |
| *B01D 21/24* | (2006.01) |
| *B04C 1/00* | (2006.01) |
| *B04C 9/00* | (2006.01) |

(52) U.S. Cl.
CPC ............ *B01D 21/26* (2013.01); *B01D 21/02* (2013.01); *B01D 21/24* (2013.01); *B04C 1/00* (2013.01); *B04C 9/00* (2013.01); *B01D 21/0009* (2013.01)

(58) Field of Classification Search
CPC ........ B01D 21/26; B01D 21/02; B01D 21/24; B01D 21/0009; B01D 21/245; B01D 21/2433; B04C 1/00; B04C 9/00; B23Q 11/00; B23Q 11/10
See application file for complete search history.

(56) References Cited

U.S. PATENT DOCUMENTS 9,393,571 B2    7/2016  Hori et al.
10,464,002 B2 * 11/2019  Seeley .................. B01D 50/40
(Continued)

FOREIGN PATENT DOCUMENTS

| CN | 103786064 A | 5/2014 |
|---|---|---|
| CN | 104364004 B | 12/2016 |

(Continued)

OTHER PUBLICATIONS

Office Action for Taiwanese Patent Application No. 111100573, Sep. 28, 2022, 8 pages.

(Continued)

*Primary Examiner* — Liam Royce
(74) *Attorney, Agent, or Firm* — John P. White

(57) ABSTRACT

According to one aspect of the present invention, a filtration device includes a tank portion including a first tank to which a liquid containing foreign matters flows, and a pump provided at a central portion of the first tank to discharge the liquid stored in the first tank. The first tank includes a bottom surface, four side surfaces connected to the bottom surface, four corners to which the bottom surface and two of the four side surfaces are connected, and four inclined surfaces covering the four corners. The four inclined surfaces are inclined to be close to the bottom surface from a connecting portion to which the two side surfaces are connected toward the central portion.

11 Claims, 19 Drawing Sheets

(56) References Cited

U.S. PATENT DOCUMENTS

| | | | |
|---|---|---|---|
| 2006/0091071 A1* | 5/2006 | Tashiro | B23Q 11/0057 210/512.1 |
| 2011/0000862 A1 | 1/2011 | Semba et al. | |
| 2014/0116930 A1* | 5/2014 | Hori | B03C 1/30 210/167.01 |
| 2016/0144320 A1 | 5/2016 | Nishio et al. | |
| 2020/0306930 A1 | 10/2020 | Nishizawa | |

FOREIGN PATENT DOCUMENTS

| | | | |
|---|---|---|---|
| CN | 110585792 A | | 12/2019 |
| CN | 111069970 A | | 4/2020 |
| JP | H10230188 A | * | 9/1998 |
| JP | 2014-87871 A | | 5/2014 |
| JP | 2018-187718 A | | 11/2018 |
| JP | 4346447 B2 | | 10/2019 |
| KR | 10-2007-0003283 A | | 1/2007 |
| TW | 256117 U | | 9/1995 |
| TW | 200418366 A | | 10/2004 |
| TW | M469948 U | | 1/2014 |
| WO | WO 03/070425 A1 | | 8/2003 |
| WO | WO 2016/132449 A1 | | 8/2016 |

OTHER PUBLICATIONS

International Search Report issued Feb. 8, 2022 in connection with PCT International Application No. PCT/JP2021/048111.

Written Opinion of the International Searching Authority issued Feb. 8, 2022 in connection with PCT International Application No. PCT/JP2021/048111.

Extended European Search Report, dated Dec. 23, 2024 in connection with corresponding European Patent Application No. 21928125.0-1014.

The First Office Action, dated Feb. 5, 2025, including Dossier generated English language translation, issued in connection with corresponding Chinese Patent Application No. 202180032988.8.

* cited by examiner

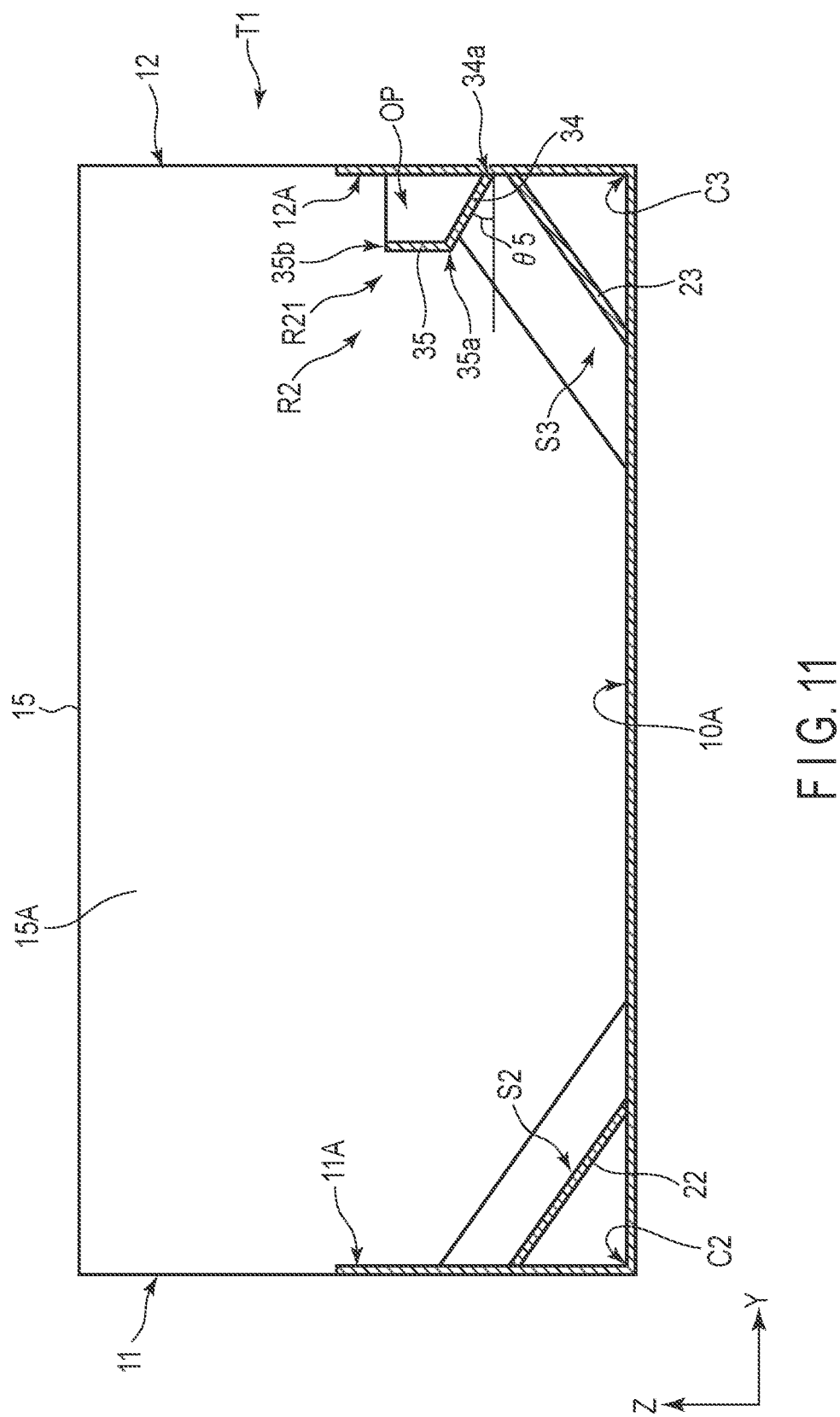
F I G. 11

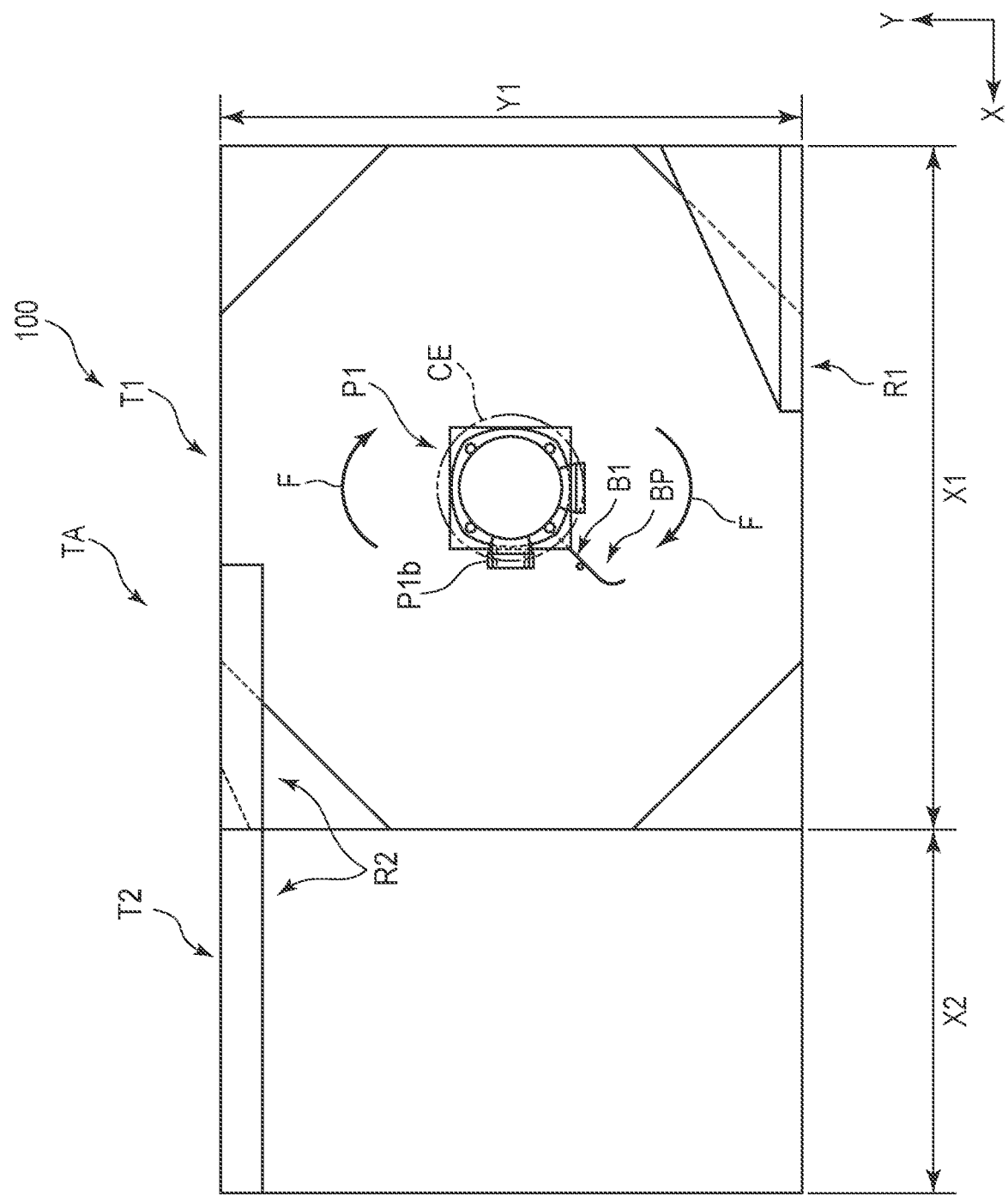
F I G. 17

VORTEX FLOW DEVICE FOR REMOVING FOREIGN MATTER FROM A LIQUID

CROSS-REFERENCE TO RELATED APPLICATIONS

This application is a Continuation Application of PCT Application No. PCT/JP2021/048111, filed Dec. 24, 2021 and based upon and claiming the benefit of priority from prior Japanese Patent Application No. 2021-028923, filed Feb. 25, 2021, the entire contents of all of which are incorporated herein by reference.

BACKGROUND OF THE INVENTION

1. Field of the Invention

The present invention relates generally to a filtration device.

2. Description of the Related Art

When grinding or cutting metal materials and the like with machine tools, various fluids referred to as a grinding fluid, a cutting fluid, coolant, and the like are used to improve machining accuracy, extend the life of the tools used, and promote the discharge of chips, metal powder, and the like. These fluids are discharged from the machine tools in a state of containing foreign matters such as chips and metal powder generated by machining.

The liquids discharged from the machine tools are returned to the machine tools for reuse after the foreign matters such as chips are separated and removed. For this reason, various devices for collecting the liquids discharged from the machine tools and separating and removing the foreign matters are known.

For example, Patent Literature 1 (JP 4346447 B) discloses a filtration device in which, when a liquid containing foreign matters flows into a filtration tank, the liquid flows along curved plates provided at corners of the filtration tank to generate a vortex flow inside the filtration tank, the foreign matters are collected in the center of the filtration tank by the vortex flow, and the collected foreign matters are sucked and discharged by a pump. This filtration device has an advantage of being able to generate a vortex flow without installing a device for generating the vortex flow in the filtration tank or forming the filtration tank itself in a cylindrical shape.

BRIEF SUMMARY OF THE INVENTION

Even if the above filtration device disclosed in Patent Literature 1 is considered, there is still room for improvement in the separation and removal of foreign matters contained in the liquids discharged from the machine tools. To separate and remove foreign matters from the liquids, for example, causing the foreign matters to be hardly retained in the filtration tank (tank) and the like are requested. Embodiments described herein aim to provide a filtration device capable of more efficiently treating foreign matters contained in a liquid discharged from a machine tool.

According to one aspect of the present invention, a filtration device comprises a tank portion including a first tank to which a liquid containing foreign matters flows, and a pump provided at a central portion of the first tank to discharge the liquid stored in the first tank. The first tank includes a bottom surface, four side surfaces connected to the bottom surface, four corners to which the bottom surface and two of the four side surfaces are connected, and four inclined surfaces covering the four corners. The four inclined surfaces are inclined to be close to the bottom surface from a connecting portion to which the two side surfaces are connected toward the central portion, and a vortex flow is generated in the first tank by the liquid flowing into the first tank to collect the foreign matters in the central portion of the first tank and discharge the foreign matters by the pump.

According to another aspect of the present invention, the filtration device comprises a first processing device which processes a liquid containing foreign matters, a tank portion including a first tank to which the liquid processed by the first processing device flows, and a pump provided at a central portion of the first tank to discharge the liquid stored in the first tank. The first tank includes a bottom surface, a plurality of side surfaces connected to the bottom surface, and a first flow path which is provided along the first side surface that is one of the plurality of side surfaces and to which the liquid processed in the first processing device flows.

The first flow path includes a bottom plate inclined from an upstream side located on an outlet side of the first processing device toward a downstream side located on the bottom surface side and inclined to be closer to the bottom surface toward the first side surface. A vortex flow is generated in the first tank by the liquid flowing into the first tank to collect the foreign matters in the central portion of the first tank and discharge the foreign matters by the pump.

According to the present invention, a filtration device capable of more efficiently treating foreign matters contained in a liquid discharged from a machine tool can be provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 11 is a schematic cross-sectional view showing the tank portion taken along line D-D in FIG. 4.

FIG. 17 is a schematic plan view showing the other example of the tank portion.

DETAILED DESCRIPTION OF THE INVENTION

One of embodiments relating to a filtration device will be described hereinafter with reference to the accompanying drawings.

In this embodiment, a filtration device for processing foreign matters from a grinding fluid discharged from a machine tool such as a polishing machine is exemplified. The foreign matters include metal powder, abrasive grains, and the like generated by grinding.

Figure 1:
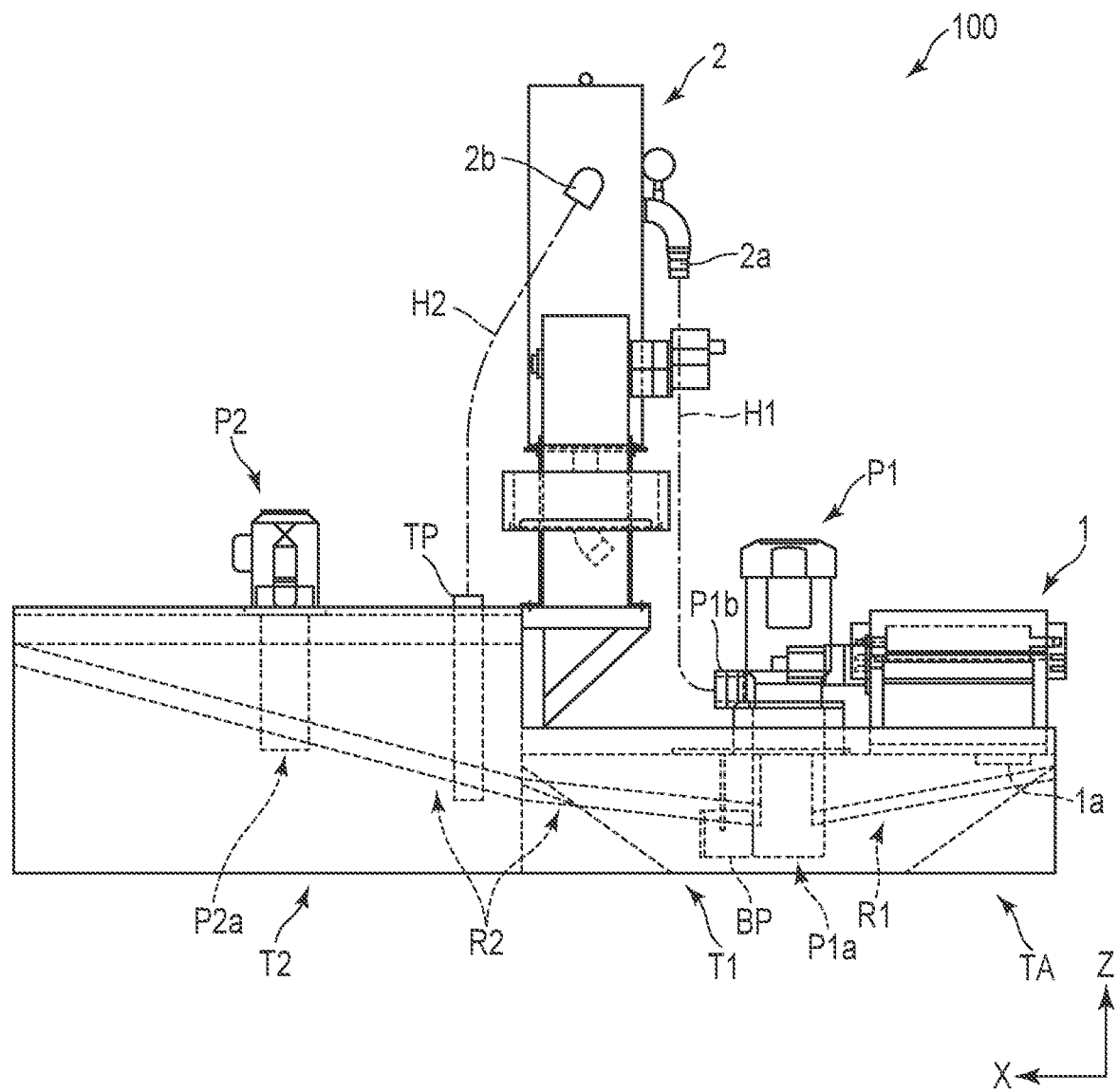
FIG. 1 is a schematic side view showing a filtration device according to one of embodiments.
Figure 2:
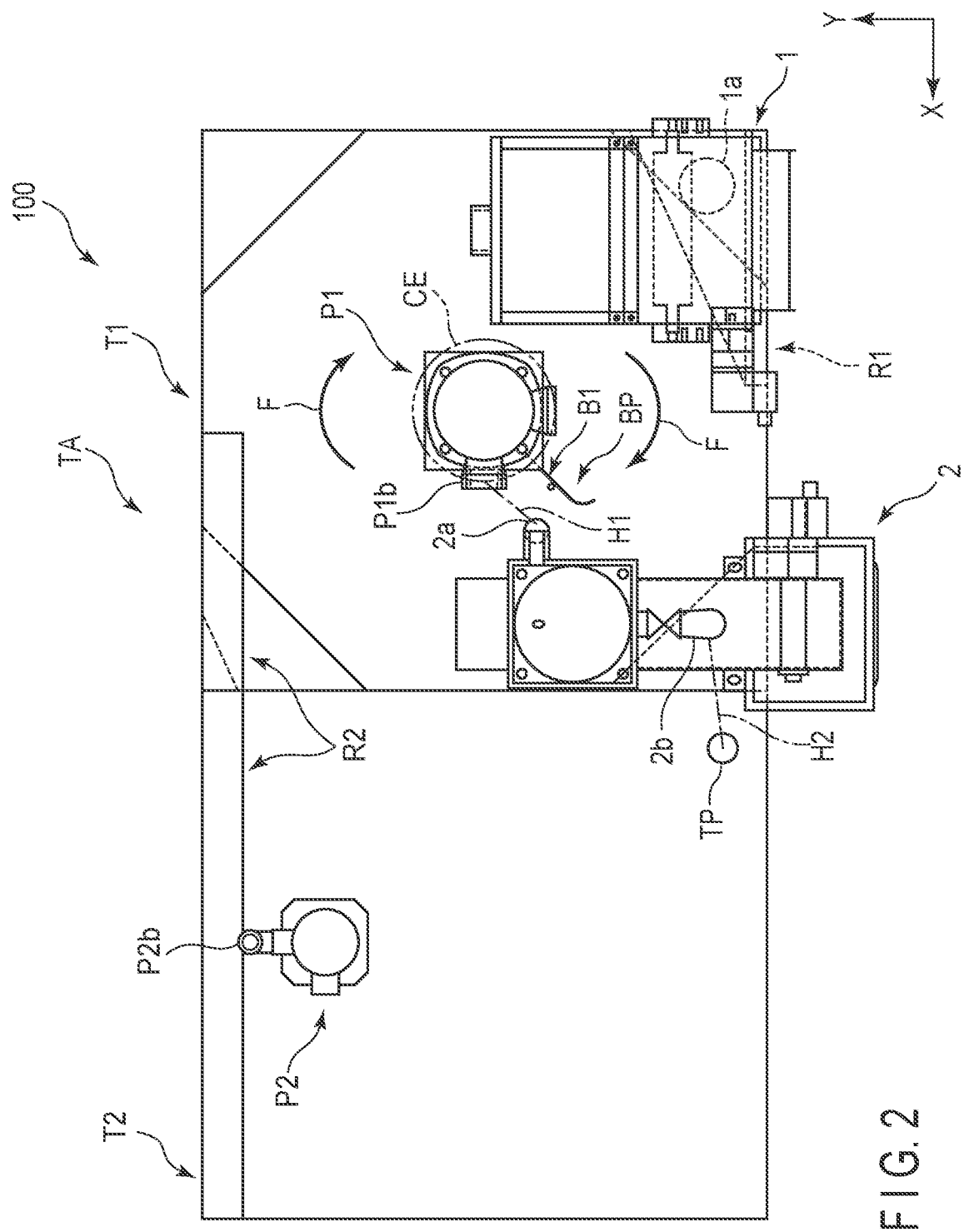
FIG. 2 is a schematic plan view showing the filtration device according to the embodiment.

FIG. 1 is a schematic side view showing a filtration device 100 according to the present embodiment. FIG. 2 is a schematic plan view showing the filtration device 100 according to the embodiment. In the following descriptions, an X direction, a Y direction, and a Z direction are defined as shown in FIG. 1 and FIG. 2. Each of the X direction and the Y direction corresponds to a horizontal direction parallel to an installation surface of the filtration device 100 and is orthogonal to each other. The Z direction corresponds to a vertical direction and is orthogonal to the X direction and the Y direction. A direction indicated by an arrow in the Z direction is often referred to as an upward direction. In addition, it is sometimes referred to as a plan view that an X-Y plane defined in the X direction and the Y direction is viewed.

The filtration device 100 comprises a tank portion TA for storing a liquid, a first processing device 1 and a second processing device 2 for processing a liquid containing foreign matters, and a first pump P1 and a second pump P2 for discharging the liquid stored in the tank portion TA. In this case, "processing" means, for example, separating or removing the foreign matters contained in a liquid discharged from a machine tool from the liquid.

The tank portion TA has a rectangular shape whose length in the X direction is longer than that in the Y direction in planar view. The tank portion TA includes a first tank T1 and a second tank T2. The tank portion TA includes a first flow path R1 through which the liquid processed in the first processing device 1 flows and a second flow path R2 through which the liquid stored in the second tank T2 flows. The first flow path R1 and the second flow path R2 are positioned diagonally to the first tank T1 in planar view.

In the first tank T1, the liquid flows from the first flow path R1 and the second flow path R2 and a vortex flow is thereby generated. A force (centripetal force) directed toward a central part of the vortex flow is exerted on the foreign matters flowing into the first tank T1 along with the liquid, due to the generated vortex flow. For this reason, the foreign matters are collected in the central portion CE of the first tank T1 while swirling in the first tank by the vortex flow.

The central part of the vortex flow overlaps with a central portion CE of the first tank T1. The central portion CE of the first tank T1 overlaps with, for example, an intersection of diagonal lines of the first tank T1 in planar view. In FIG. 2, a flow direction of the vortex flow is indicated by an arrow F. Furthermore, a plate material BP having a surface B1 intersecting the flow direction of the vortex flow is provided in the vicinity of the first pump P1 in the first tank T1.

In the example illustrated, the first processing device 1 and the second processing device 2 are provided above the first tank T1. The first processing device 1 processes the liquid discharged from the machine tool before flowing into the first tank T1. The first processing device 1 is, for example, a magnet type separator. When a magnetic substance is contained in the liquid discharged from the machine tool, the magnetic substance is processed from the liquid in the first processing device 1.

The first processing device 1 includes an outlet 1a which opens toward the first tank T1. The liquid processed in the first processing device 1 is discharged from the outlet 1a. The amount of the liquid processed in the first processing device 1 is, for example, 80 L to 360 L per minute. The liquid discharged from the first processing device 1 contains foreign matters that cannot be processed in the first processing device 1.

The second processing device 2 processes the liquid discharged from the first tank T1 before flowing into the second tank T2. The second processing device 2 is, for example, a cyclone-type foreign matter separating device which removes the foreign matters contained in the liquid by a centrifugal force. In the second processing device 2, foreign matters which cannot be processed in the first processing device 1 are processed from the liquid. The foreign matters processed in the second processing device 2 are discharged to a recovery tank different from the tank portion TA. The amount of the liquid processed in the second processing device 2 is, for example, 100 L to 300 L per minute. The second processing device 2 includes an inlet 2a and an outlet 2b.

The first pump P1 is provided at the central portion CE of the first tank T1. The second pump P2 is provided in the vicinity of the second flow path R2 in the second tank T2. The first pump P1 and second pump P2 include suction ports P1a and P2a located on the sides of bottom surfaces 10A and 10B to be described later and discharge ports P1b and P2b, respectively. The foreign matters collected in the central portion CE of the first tank T1 are sucked from the suction port P1a of the first pump P1 together with the liquid and are discharged from the discharge port P1b.

The discharge port P1b of the first pump P1 is connected to an inlet 2a of the second processing device 2 by a hose H1. An outlet 2b of the second processing device 2 is connected to an introduction pipe TP provided in the second tank T2 by a hose H2. The first processing device 1, the second processing device 2, the first pump P1, and the second pump P2 are provided in the tanks T1 and T2, respectively, by support and the like.

Next, a flow of the liquid in the filtration device 100 will be described. First, the liquid discharged from a machine tool (not shown) is processed by the first processing device 1 before flowing into the first tank T1. The liquid processed in the first processing device 1 is discharged from the outlet 1a. The first flow path R1 of the first tank T1 is provided at a position overlapping the outlet 1a in the Z direction. The liquid discharged from the outlet 1a flows into the first tank T1 through the first flow path R1.

The foreign matters that cannot be processed in the first processing device 1 flow into the first tank T1 together with the liquid. When the foreign matters flow into the first tank T1, the foreign matters are collected in the central portion CE of the first tank T1 while swirling by the vortex flow in the first tank T1. Then, the liquid stored in the first tank T1 is sucked from the suction port P1a of the first pump P1 together with the foreign matters collected in the central portion CE.

The liquid sucked into the first pump P1 flows from the discharge port P1b into the second processing device 2 through the hose H1 from the inlet 2a and is processed. The liquid processed in the second processing device 2 flows from the outlet 2b into the second tank T2 through the hose H2 from the inlet pipe TP. The liquid processed in the second processing device 2 contains little foreign matters.

The liquid stored in the second tank T2 is sucked from the suction port P2a of the second pump P2 and is sent to the machine tool again through a pipe (not shown) connected to the discharge port P2b. In addition, in the second tank T2, when the liquid level of the liquid stored in the second tank T2 exceeds a predetermined height, the liquid stored in the second tank T2 flows from the second tank T2 into the first tank T1 via the second flow path R2.

Figure 3:
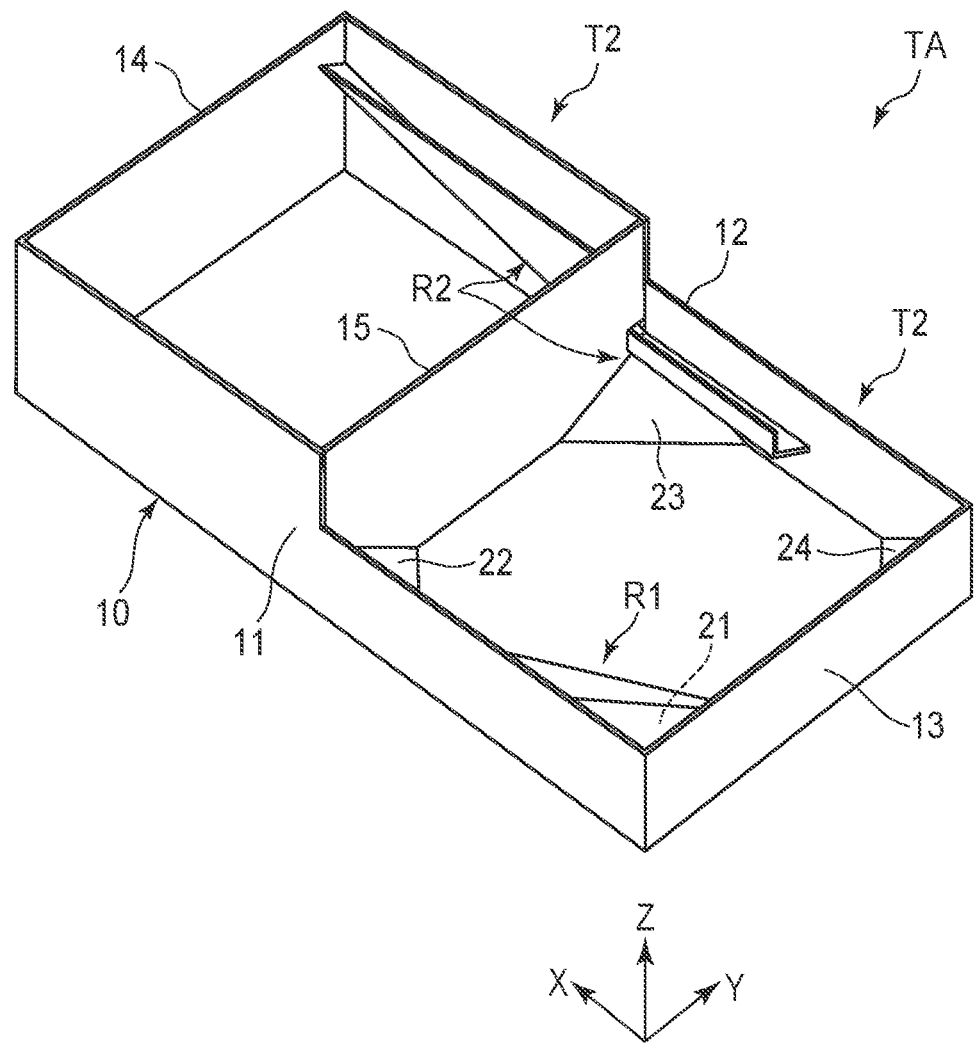
FIG. 3 is a schematic perspective view showing a tank portion provided in the filtration device.
Figure 4:
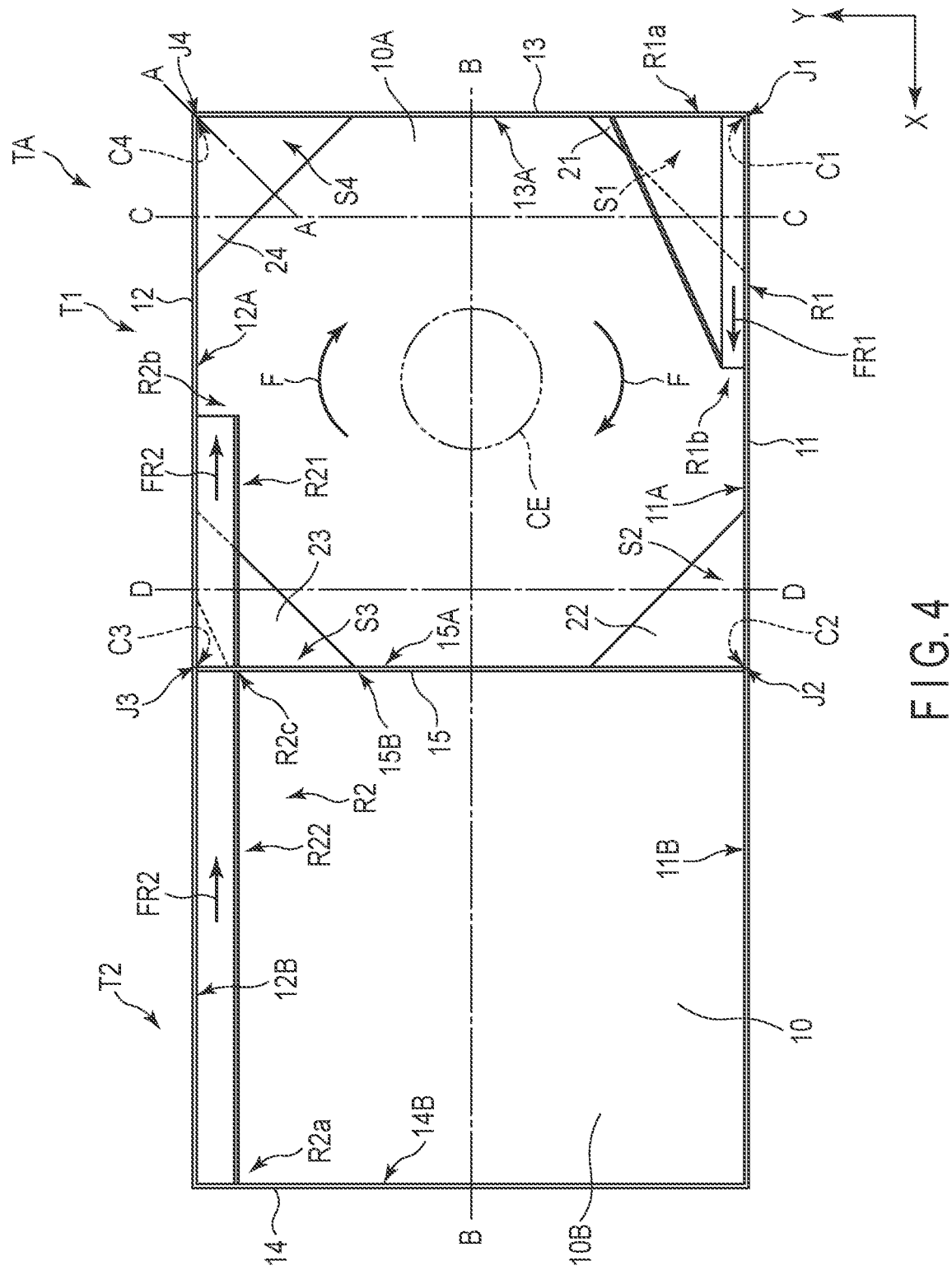
FIG. 4 is a schematic plan view showing the tank portion provided in the filtration device.

Next, the tank portion TA will be described. FIG. 3 is a schematic perspective view showing the tank portion TA which the filtration device 100 comprises. FIG. 4 is a schematic plan view showing the tank portion TA which the filtration device 100 comprises. In addition, in FIG. 3 and the following figures, elements of the first pump P1 and the like constituting the filtration device 100 are partially omitted.

The tank portion TA is formed of a bottom plate 10, a first side plate 11 and a second side plate 12 arranged in the Y direction, and a third side plate 13 and a fourth side plate 14 arranged in the X direction. The first side plate 11 and the second side plate 12 are parallel to an X-Z plane defined by the X direction and the Z direction. The third side plate 13 and the fourth side plate 14 are parallel to a Y-Z plane defined by the Y direction and the Z direction. The tank portion TA is located between the third side plate 13 and the fourth side plate 14, and further includes a partition plate 15 parallel to the third side plate 13 and the fourth side plate 14. The partition plate 15 separates the tank portion TA into the first tank T1 located on the third side plate 13 side and the second tank T2 located on the fourth side plate 14 side.

The lengths of the first side plate 11 and the second side plate 12 in the X direction are equal to each other. The lengths of the third side plate 13, the fourth side plate 14, and the partition plate 15 in the Y direction are equal to each other. The length of the third side plate 13 in the Z direction is shorter than the length of the fourth side plate 14 in the Z direction. In addition, the length of the fourth side plate 14 in the Z direction is equal to the length of the partition plate 15 in the Z direction.

In the first side plate 11 and the second side plate 12, a length of a side connected to the third side plate 13 is equal to the length of the third side plate 13 in the Z direction, and a length of a side connected to the fourth side plate 14 is equal to the length of the fourth side plate 14 in the Z direction. In the first side plate 11 and the second side plate 12, a length of a portion connected to the partition plate 15 in the Z direction is equal to a length of a side connected to the fourth side plate 14. For this reason, the length of the second tank T2 in the Z direction is longer than the length of the first tank T1 in the Z direction. The liquid level of the liquid stored in the second tank T2 can be made higher than the liquid level of the liquid stored in the first tank T1.

The first tank T1 and the second tank T2 have a rectangular parallelepiped shape with an open upper portion, and the first tank T1 and the second tank T2 are arranged in this order along the X direction. In the example illustrated, the first tank T1 has a square shape in which the length in the X direction and the length in the Y direction are equal to each other in planar view. Similarly to the first tank T1, the second tank T2 may have a square shape having the same lengths in the X direction and the Y direction, or may have a rectangular shape.

The size of the tank portion TA is appropriately changed depending on the processing amounts of the first processing device 1 and the second processing device 2, or the like. For example, the length of the first tank T1 in the X direction is 500 mm to 2,000 mm. For example, the length of the first tank T1 in the Y direction is 500 mm to 2,000 mm. For example, the length of the first tank T1 in the Z direction is, for example, 200 mm to 500 mm.

The tank portion TA may be formed by bending a plate material or the like. In addition, the first tank T1 and the second tank T2 may be formed as separate tanks. The bottom plate 10, and each of the side plates 11 to 14 and the partition plate 15 are formed of, for example, a metal material.

The first tank T1 includes a bottom surface 10A which the bottom plate 10 has, a first side surface 11A which the first side plate 11 has, a second side surface 12A which the second side plate 12 has, a third side surface 13A which the third side plate 13 has, and a side surface 15A which the partition plate 15 has on the first tank T1 side. Four side surfaces 11A to 13A and 15A are connected to the bottom surface 10A. The first side surface 11A is opposed to the second side surface 12A in the Y direction. The third side surface 13A is opposed to the fourth side surface 15A in the X direction.

The first tank T1 includes a connecting portion J1 to which the first side surface 11A and the third side surface 13A are connected, and a corner C1 to which the bottom surface 10A and the connecting portion J1 (the first side surface 11A and the third side surface 13A) are connected. Similarly, the first tank T1 includes a connecting portion J2 to which the first side surface 11A and the fourth side surface 15A are connected, and a corner C2 to which the bottom surface 10A and the connecting portion J2 (the first side surface 11A and the fourth side surface 15A) are connected.

The first tank T1 includes a connecting portion J3 to which the second side surface 12A and the fourth side surface 15A are connected, and a corner C3 to which the bottom surface 10A and the connecting portion J3 (the second side surface 12A and the fourth side surface 15A) are connected. The first tank T1 includes a connecting portion J4 to which the second side surface 12A and the third side surface 13A are connected, and a corner C4 to which the bottom surface 10A and the connecting portion J4 (the second side surface 12A and the third side surface 13A) are connected. The connecting portions J1 to J4 are connected to each other at an angle of approximately 90 degrees by each side surface, but each of the connecting portions J1 to J4 may be rounded.

Furthermore, four inclined surfaces S1 to S4 covering the corners C1 to C4 are provided, respectively, in the first tank T1. In the embodiment, each of the inclined surfaces S1 to S4 is formed by the plate materials 21 to 24. The shape of the plate materials 21 to 24 are, for example, a triangular shape. In addition, when the plate materials 21 and 23 are in contact with the first flow path R1 and the second flow path R2, parts of the triangular plate materials may be processed.

For example, the plate materials 21 to 24 are desirably flat plates having no curved surfaces. Each of the corners C1 to C4 can be covered from the center portion CE side of the first tank T1 by providing four plate materials 21 to 24. The plate materials 21 to 24 are formed of, for example, a metal material, similarly to the bottom plate 10 and the first side plate 11 forming the tank portion TA, and the like.

In the example illustrated, the inclined surface S1 is connected to the bottom surface 10A, the first side surface 11A, and the third side surface 13A. The inclined surface S2 is connected to the bottom surface 10A, the first side surface 11A, and the fourth side surface 15A. The inclined surface S3 is connected to the bottom surface 10A, the second side surface 12A, and the fourth side surface 15A. The inclined surface S4 is connected to the bottom surface 10A, the second side surface 12A, and the third side surface 13A. For this reason, no liquid flows between the corners C1 to C4 and the inclined surfaces S1 to S4.

Figure 5:
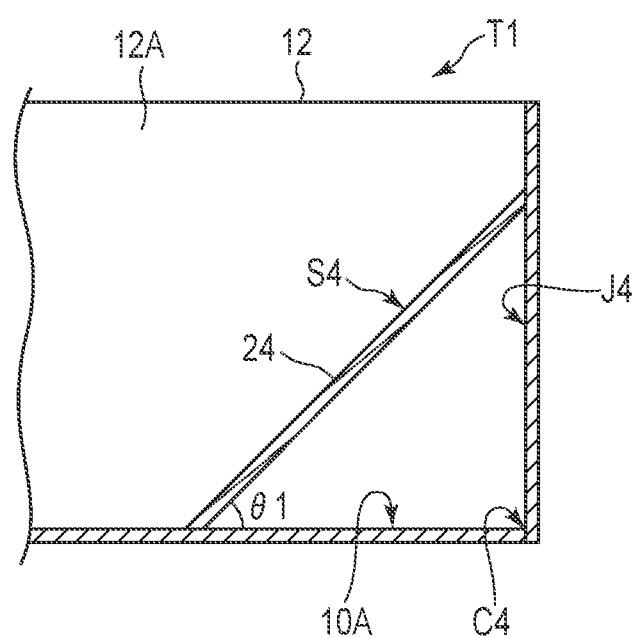
FIG. 5 is a schematic cross-sectional view showing the tank portion taken along line A-A in FIG. 4.

FIG. 5 is a schematic cross-sectional view showing the tank portion TA taken along line A-A in FIG. 4. The inclined surface S4 covering the corner C4 will be described with reference to FIG. 5. As described above, the bottom surface 10A and the connecting portion J4 are connected to the corner C4. The inclined surface S4 of the plate material 24 is provided in the first tank T1 so as to cover the corner C4 from the center portion CE side of the first tank T1.

For example, a length of the side connected to the second side surface 12A, in the plate material 24, is equal to the length of the side connected to the third side surface 13A. In addition, the length of the side connected to the second side 12A, in the plate material 24, may be shorter than, longer than, or equal to the length of the side connected to the bottom surface 10A.

The inclined surface S4 is inclined to be closer to the bottom surface 10A from the connecting portion J4 toward the central portion CE of the first tank T1 shown in FIG. 4. An angle θ1 formed between the bottom surface 10A and the plate material 24 is desirably, for example, 60 degrees or less. The angle θ1 is appropriately changed according to the processing amount of the filtration device 100, the capacity of the first tank T1, and the like.

For example, the plate material 24 can be provided such that the angle θ1 becomes 45 degrees, 50 degrees, and 55 degrees in accordance with the size of the first tank T1. In addition, a vertex located on a side opposite to the bottom surface 10A, in the plate material 24, is more separated from the bottom surface 10A than the liquid level of the liquid stored in the first tank T1, in the Z direction. The apex located on the side opposite to the bottom surface 10A, in the plate material 24, may be closer to the bottom surface 10A than the liquid level of the liquid stored in the first tank T1 in the Z direction.

The inclined surface S4 covering the corner C4 has been described, and the other inclined surfaces S1 to S3 are constituted in the same manner. In other words, the plate material 21 is provided in the first tank T1 such that the inclined surface S1 covers the corner C1. The plate material 22 is provided in the first tank T1 such that the inclined surface S2 covers the corner C2. The plate material 23 is provided in the first tank T1 such that the inclined surface S3 covers the corner C3. For example, the plate materials 21 to 23 are provided in the first tank T1 such that an angle formed by the bottom surface 10A and each of the plate materials 21 to 23 is equal to the angle θ1.

Since the corners C1 to C4 of the first tank T1 are covered with the inclined surfaces S1 to S4, respectively, a portion where the flow velocity is slow can hardly be generated in the liquid flowing through the first tank T1 and the liquid can flow through the first tank T1 at a substantially uniform flow rate. The rotation efficiency of the liquid in the first tank T1 can be improved by providing the inclined surfaces S1 to S4 on the first tank T1.

For this reason, the liquid can easily flow in the whole of the first tank T1 by the generated vortex, and retention and accumulation of foreign matters can hardly occur in the first tank T1. In addition, retention of floating matters such as bubbles and foreign matters hardly occurs at the liquid level.

The second tank T2 includes a bottom surface 10B which the bottom plate 10 has, a fifth side surface 11B which the first side plate 11 has, a sixth side surface 12B which the second side plate 12 has, a seventh side surface 15B which the partition plate 15 has on the second tank T2 side (opposite to the fourth side surface 15A), and an eighth side surface 14B which the fourth side plate 14 has. Four side surfaces 11B, 12B, 14B, and 15B are connected to the bottom surface 10B. The fifth side surface 11B is opposed to the sixth side surface 12B in the Y direction. The seventh side surface 15B is opposed to the eighth side surface 14B in the X direction.

Figure 6:
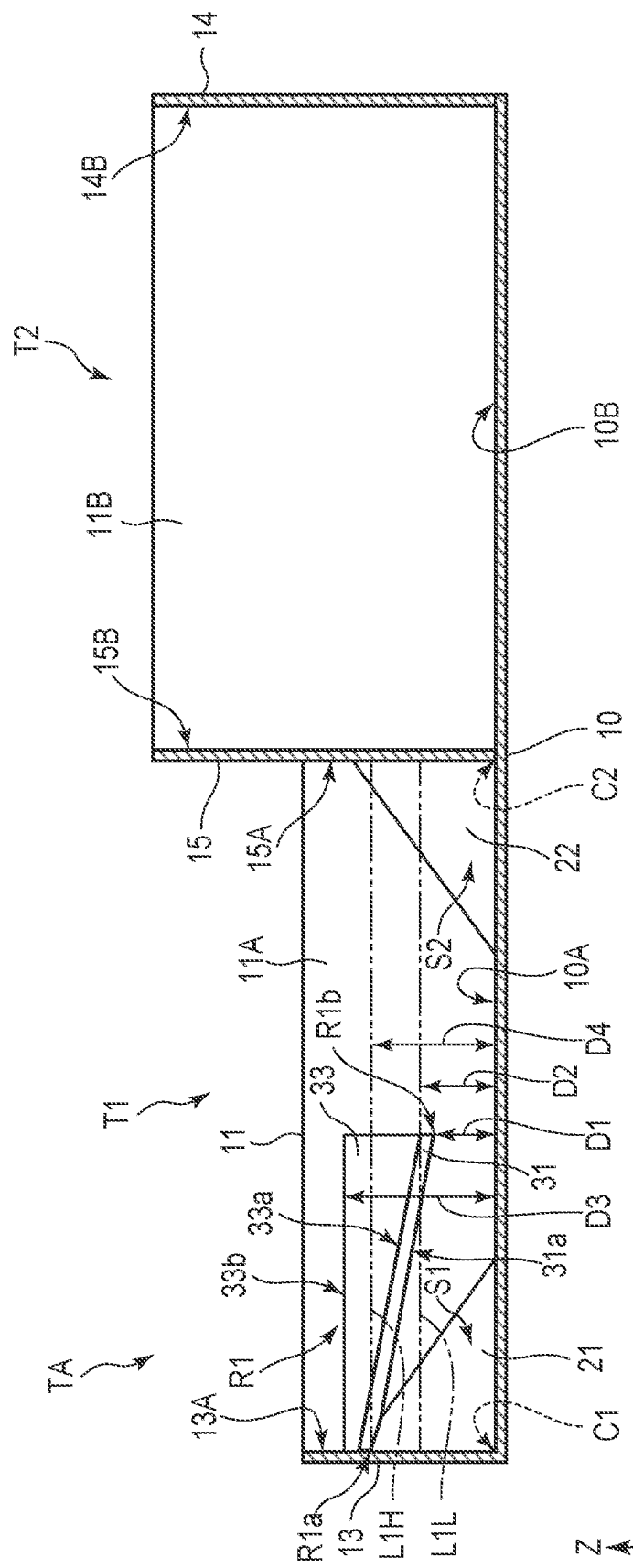
FIG. 6 is a schematic cross-sectional view showing the tank portion taken along line B-B in FIG. 4.
Figure 7:
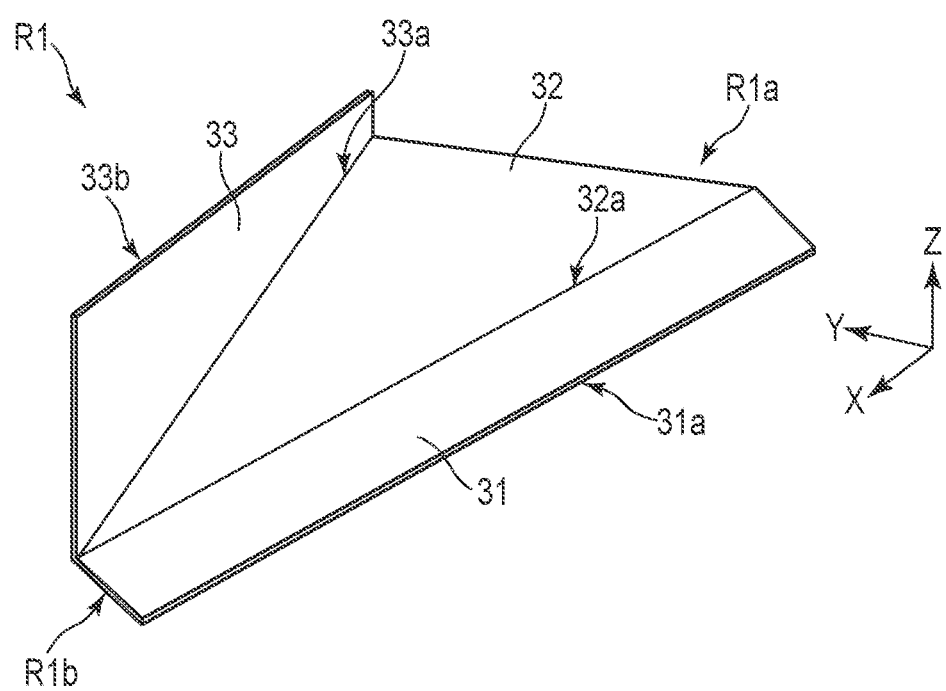
FIG. 7 is a schematic perspective view showing a first flow path.
Figure 8:
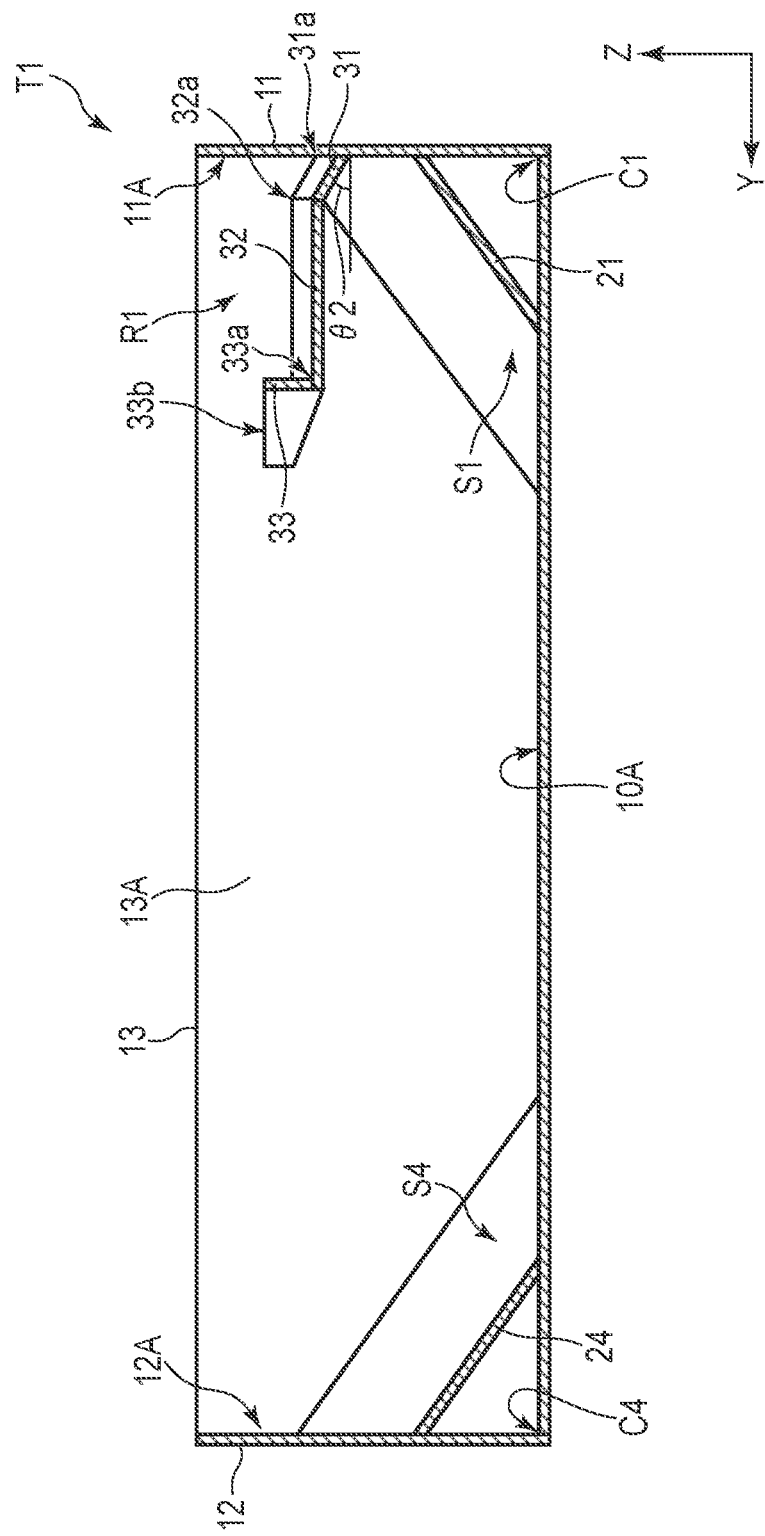
FIG. 8 is a schematic cross-sectional view showing the tank portion taken along line C-C in FIG. 4.

Next, the first flow path R1 will be described. FIG. 6 is a schematic cross-sectional view showing the tank portion TA taken along line B-B in FIG. 4. FIG. 7 is a schematic perspective view showing the first flow path R1. FIG. 8 is a schematic cross-sectional view showing the tank portion TA taken along line C-C in FIG. 4. FIG. 6 is a cross-section of the tank portion TA viewed from the direction opposite to the Y direction. FIG. 8 is a cross-section of the tank portion TA viewed from the direction opposite to the X direction.

As shown in FIG. 6, the first flow path R1 is provided along the first side surface 11A of the first side plate 11 in the first tank T1. The first flow path R1 is located on the connecting portion J1 side of the first tank T1. The first flow path R1 includes an end portion R1a located on the third side plate 13 side in the X direction and an end portion R1b located on the partition plate 15 side. The outlet 1a of the first processing device 1 shown in FIG. 1 and FIG. 2 is located above the end portion R1a side.

The first flow path R1 is inclined to be closer to the bottom surface 10A from the end portion R1a toward the end portion R1b in the X direction. The inclination from the end portion R1a to the end portion R1b is constant. From the other viewpoint, the length of the end portion R1a and the bottom surface 10A in the Z direction is longer than the length of the end portion R1b and the bottom surface 10A. The end portion R1b is located more closely to the bottom surface 10A side in the Z direction than the end portion R1a. The liquid flowing through the first flow path R1 flows from the end portion R1a toward the end portion R1b.

In the first flow path R1, the end portion R1a side corresponds to an upstream side, and the end portion R1b side corresponds to a downstream side. In FIG. 4, the direction of flow of the liquid flowing through the first flow path R1 is indicated by an arrow FR1. The liquid flowing through the first flow path R1 flows from the third side surface 13A side toward the fourth side surface 15A side.

In the example illustrated, the end portion R1a is connected to the third side surface 13A, and no gap is formed between the end portion R1a and the third side surface 13A. The end portion R1b is located near the center of the first side surface 11A in the X direction. By extending the first flow path R1 to the vicinity of the center of the first side surface 11A, the flow of the liquid flowing through the first flow path R1 can be more utilized for the generation of a vortex flow in the first tank T1, the increase in the flow rate of the liquid flowing in the first tank T1, and the like.

The first flow path R1 includes a bottom plate 31 connected to the first side surface 11A, a bottom plate 32 connected to the bottom plate 31, and a side plate 33 connected to the bottom plate 32. The shape of the bottom plate 31 is a rectangular shape. The shape of the bottom plate 32 is a triangular shape. A length of the bottom plate 32 in the Y direction (width direction) is made shorter along the X direction. The first flow path R1 is formed in a fan shape by the bottom plates 31 and 32. In other words, in the Y direction (width direction) of the first flow path R1, the length of the end portion R1a side is longer than that of the end portion R1b side. The side plate 33 is provided parallel to the Z direction.

For example, a size of the end portion R1a side of the first flow path R1 is larger than a size of the outlet 1a of the first processing device 1. In this case, the liquid discharged from the outlet 1a of the first processing device 1 can easily flow into the first flow path R1 from the end portion R1a side.

Furthermore, since no gap is formed between the end portion R1a and the third side surface 13A, the liquid discharged from the outlet 1a of the first processing device 1 can hardly flow into the first tank T1 directly without passing through the first flow path R1. Allowing the liquid processed in the first processing device 1 to flow into the first tank T1 through the first flow path R1 can be utilized for the generation of a vortex flow in the first tank T1 and the increase in a flow rate of the liquid flowing into the first tank T1.

The bottom plates 31 and 32 and the side plate 33 are formed of, for example, a metal material, similarly to the bottom plate 10 and the first side plate 11 forming the tank portion TA, and the like. The first flow path R1 may be formed of a plurality of plate materials or may be formed by bending one plate material.

As shown in FIG. 8, the bottom plate 31 is inclined to be closer to the bottom surface 10A from the side 32a connected to the bottom surface 32 toward the side 31a connected to the first side surface 11A in the direction opposite to the Y direction. From the other viewpoint, the length of the side 32a and the bottom surface 10A in the Z direction is longer than the length of the side 31a and the bottom surface 10A, in the Y direction.

As shown in FIG. 8, an angle θ2 formed by a plane parallel to the bottom surface 10A and the bottom plate 31 in the Y direction is, for example, 15 degrees or more and 60 degrees or less (15 degrees ≤θ2≤60 degrees), preferably, 25 degrees or more and 45 degrees or less (25 degrees≤θ2≤45 degrees). For example, the bottom plate 31 can be provided such that the angle θ2 is 30 degrees.

Since the bottom plate 31 is inclined as described above, the flow rate of the liquid flowing through the first flow path R1 increases as compared with a case where the bottom plate 31 is not inclined in the Y direction. The foreign matters contained in the liquid can easily be made to flow from the first flow path R1 into the first tank T1 by increasing the flow rate. Furthermore, the flow rate of the liquid flowing through the first tank T1 can be increased by increasing the flow rate of the liquid flowing through the first flow path R1.

In addition, since the bottom plate 31 is inclined as described above, the flow of the liquid stored in the first tank T1 and the flow of the liquid in the portion in contact with the bottom plate 31 are hardly obstructed. In other words, the liquid flows from the first side surface 11A side toward the center portion CE side along the surface of the bottom plate 31 on the liquid level side. For this reason, even if floating matters such as bubbles or foreign matters exist on the liquid level, the floating matters flow along the bottom plate 31 along with the flow of the liquid, and can hardly be retained between the liquid level of the liquid stored in the first tank T1 and the bottom plate 31.

In contrast, the bottom plate 32 is not inclined in the Y direction. From the other viewpoint, the length of the side plate, 33, the connected side 33a, and the bottom surface 10A is equal to the length of the side 32a and the bottom surface 10A. Similarly to the bottom plate 31, the bottom plate 32 may be inclined to be closer to the bottom surface 10A from the side 33a toward the side 32a. As shown in FIG. 6, the side 33b located on a side opposite to the side 33a included in the side plate 33 is parallel to the X direction.

In FIG. 6, the liquid levels of the liquid stored in the first tank T1 during operation of the filtration device 100 are indicated by a liquid level L1L and a liquid level L1H, respectively. For example, the liquid level L1L is a position at which the liquid level is the lowest, and the liquid level L1H is a position at which the liquid level is the highest. The liquid level of the liquid stored in the first tank T1 may be varied in a range from the liquid level L1H to the liquid level L1L during the operation of the filtration device 100.

A length D1 between the end portion R1b and the bottom surface 10A in the Z direction is shorter than a length D2 between the liquid level L1L and the bottom surface 10A (D1<D2). At least a part of the end portion R1b is immersed in the liquid during the operation of the filtration device 100. For this reason, a gap can hardly be formed between the end portion R1b and the liquid level.

The side 33b of the side plate 33 is more separated from the bottom surface 10A than the liquid level L1H in the Z direction. A length D3 of the side 33b and the bottom surface 10A in the Z direction is longer than a length D4 of the liquid level L1H and the bottom surface 10A (D3>D4). The liquid stored in the first tank T1 during the operation of the filtration device 100 can hardly flow into the first flow path R1 beyond the side plate 33. For this reason, the flow of the liquid flowing through the first flow path R1 is hardly obstructed by the liquid stored in the first tank T1, and the rate of the liquid flowing through the first flow path R1 is hardly decreased.

Figure 9:
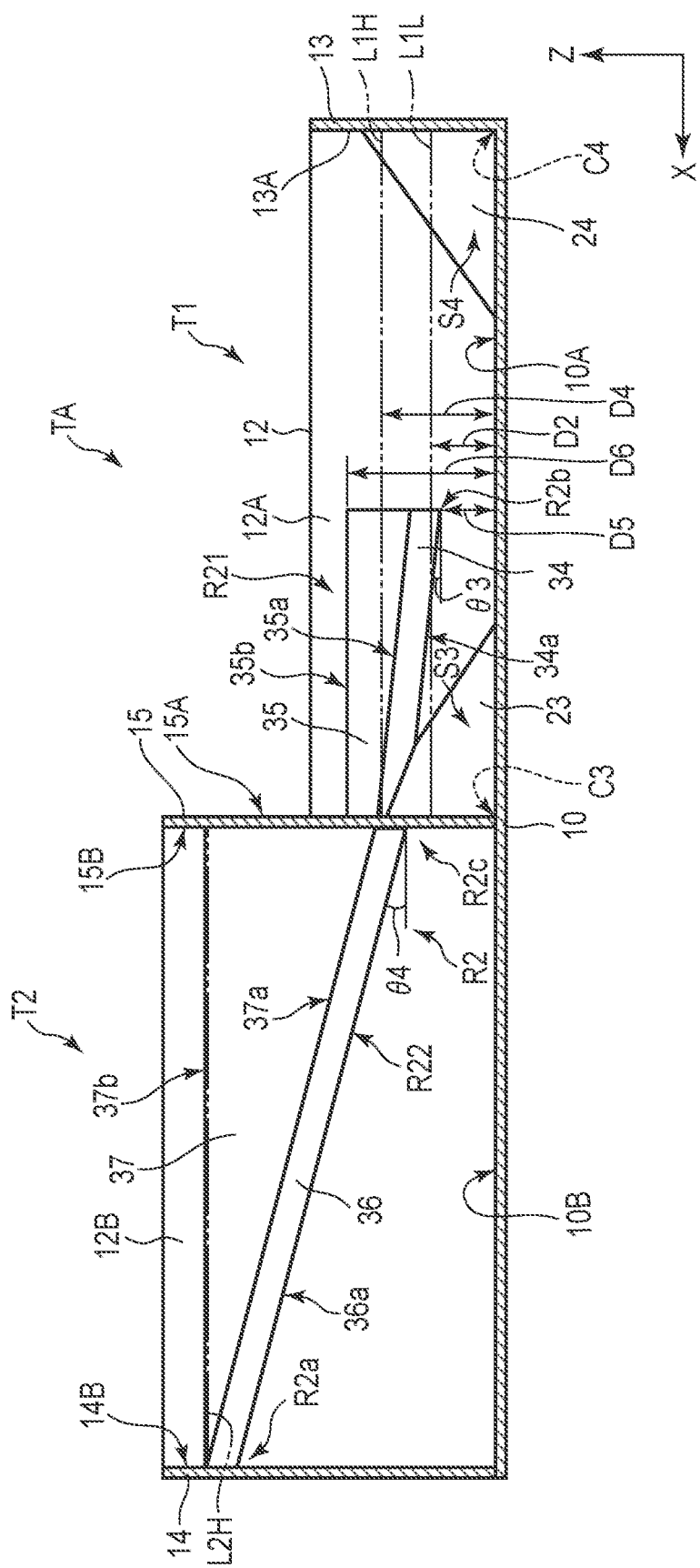
FIG. 9 is a schematic cross-sectional view showing the tank portion taken along line B-B in FIG. 4.
Figure 10:
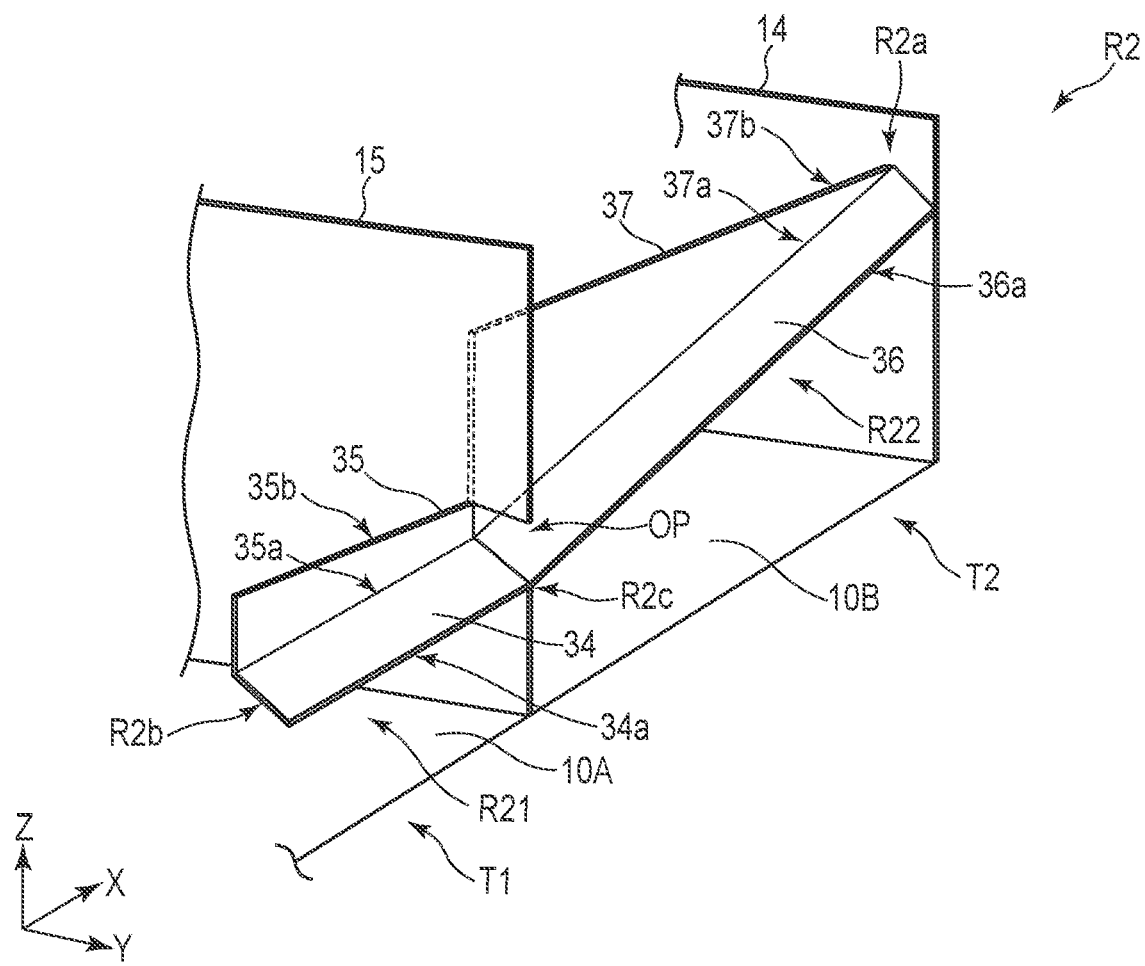
FIG. 10 is a schematic perspective view showing a second flow path.

Next, the second flow path R2 will be described. FIG. 9 is a schematic cross-sectional view showing the tank portion TA taken along line B-B in FIG. 4. FIG. 10 is a schematic perspective view showing the second flow path R2. FIG. 11 is a schematic cross-sectional view showing the tank portion TA taken along line D-D in FIG. 4. FIG. 9 is a cross-section of the tank portion TA viewed from the Y direction. FIG. 11 is a cross-section of the tank portion TA viewed from the X direction. FIG. 10 shows parts of the second flow path R2 and the tank portion TA.

As shown in FIG. 9, the second flow path R2 is provided along the second side surface 12A and the sixth side surface 12B of the sixth side plate 12. The second flow path R2 is located on the connecting portion J3 side of the first tank T1.

The second flow path R2 includes a first portion R21 provided on the first tank T1 side and a second portion R22 provided on the second tank T2 side. The first portion R21 and the second portion R22 are connected to each other through an opening OP (see FIG. 10) of the partition plate 15 shown in FIG. 10. The opening OP is provided at an end part of the partition plate 15 on the second side plate 12 side.

The second flow path R2 includes an end portion R2a located on the fourth side plate 14 side in the X direction, an end portion R2b located on the third side plate 13 side, and a connecting portion R2c connected to the opening OP. In the example illustrated, the length of the second portion R22 in the X direction is longer than the length of the first portion R21 in the X direction. The length of the second portion R22 in the X direction may be shorter than the length of the first portion R21 in the X direction.

In the direction opposite to the X direction, the first portion R21 is inclined so as to be closer to the bottom surface 10A from the connecting portion R2c toward the end portion R2b. The inclination from the connecting portion R2c to the end portion R2b is constant. From the other viewpoint, the length of the connecting portion R2c and the bottom surface 10A in the Z direction is longer than the length of the end portion R2b and the bottom surface 10A. The end portion R2b is located more closely to the bottom surface 10A side in the Z direction than the connecting portion R2c. The liquid flowing through the first portion R21 flows from the connecting portion R2c toward the end portion R2b. At the first portion R21, the connecting portion R2c side corresponds to an upstream side, and the end portion R2b side corresponds to a downstream side.

The second portion R22 is inclined so as to be closer to the bottom surface 10B from the end portion R2a toward the connecting portion R2c, in the direction opposite to the X direction. The inclination from the end portion R2a to the connecting portion R2c is constant. From the other viewpoint, the length of the end portion R2a and the bottom surface 10B in the Z direction is longer than the length of the end portion R2c and the bottom surface 10B. The connecting portion R2c is located more closely to the bottom surface 10B side in the Z direction than the end portion R2a. The liquid flowing through the second portion R22 flows from the end portion R2a toward the connecting portion R2c. At the second portion R22, the end portion R2a side corresponds to an upstream side, and the connecting portion R2c side corresponds to a downstream side.

In other words, the end portion R2a side corresponds to an upstream side, and the end portion R2b side corresponds to a downstream side, in the second flow path R2. The liquid flowing through the second flow path R2 flows from the end portion R2a toward the end portion R2b through the connecting portion R2c (opening OP). In FIG. 4, the direction of flow of the liquid flowing through the second flow path R2 is indicated by an arrow FR2. The liquid flowing through the second flow path R2 flows from the eighth side surface 14B side toward the third side surface 13A side. The flow direction of the liquid flowing through the second flow path R2 is opposite to the flow direction of the liquid flowing through the first flow path R1.

In the example illustrated, the end portion R2a is connected to the eighth side surface 14B, and no gap is formed between the end portion R2a and the eighth side surface 14B. The end portion R2b is located near the center of the second side surface 12A in the X direction. By thus extending the second flow path R2 to the vicinity of the center of the second side surface 12A, the flow of the liquid flowing through the second flow path R2 can be more utilized for the generation of a vortex flow in the first tank T1, the increase in the flow rate of the liquid flowing through the first tank T1, and the like, similarly to the first flow path R1.

In the example shown in FIG. 9, an angle θ4 formed by a plane parallel to the bottom surfaces 10A and 10B and the second portion R22 is larger than an angle θ3 formed by the plane parallel to the bottom surfaces 10A and 10B and the first portion R21 (θ4>θ3). The first portion R21 is inclined at the same inclination as the first flow passage R1 described with reference to FIG. 6.

The first portion R21 of the second flow path R2 includes a bottom plate 34 connected to the second side surface 12A and a side plate 35 connected to the bottom plate 34. The second portion R22 of the second flow path R2 includes a bottom plate 36 connected to the sixth side surface 12B and a side plate 37 connected to the bottom plate 36.

The bottom plates 34 and 36 have a rectangular shape. In the example illustrated, the length of the bottom plate 34 and the bottom plate 36 in the Y direction (width direction) is equal. In the example illustrated, a length of the bottom plate 31 of the first flow path R1 in the Y direction (width direction) is shorter than a length of the bottom plates 34 and 36 of the second flow path R2 in the Y direction (width direction). The length of the bottom plate 31 of the first flow path R1 in the Y direction (width direction) may be longer than the length of the bottom plates 34 and 36 of the second flow path R2 in the Y direction (width direction), in accordance with the processing amount of the filtration device 100. The side plates 35 and 37 are provided parallel to the second side plate 12.

The bottom plates 34 and 36 and the side plates 35 and 37 are formed of, for example, a metal material, similarly to the bottom plate 10 and the first side plate 11 forming the tank portion TA, and the like. The first portion R21 and the second portion R22 of the second flow path R2 may be formed of a plurality of plate materials or may be formed by bending one plate material.

As shown in FIG. 11, the bottom plate 34 is inclined to be closer to the bottom surface 10A from the side 35a connected to the side plate 35 toward the side 34a connected to the second side plate 12A, in the Y direction. From the other viewpoint, the length of the side 35a and the bottom surface 10A in the Z direction is longer than the length of the side 34a and the bottom surface 10A, in the Y direction.

As shown in FIG. 11, an angle θ5 formed by a plane parallel to the bottom surface 10A and the bottom plate 34 in the Y direction is, for example, 15 degrees or more and 60 degrees or less (15 degrees≤θ5≤60 degrees), preferably, 25 degrees or more and 45 degrees or less (25 degrees≤θ5≤45 degrees). For example, the bottom plate 34 can be provided such that the angle θ5 is 30 degrees. In addition, the angle θ5 may be equal to, for example, the angle θ2 formed by the plane parallel to the bottom surface 10A and the bottom plate 31, in the first flow path R1 described with reference to FIG. 8.

The bottom plate 36 is inclined to be closer to the bottom surface 10B from the side 37a connected to the side plate 37 toward the side 36a connected to the sixth side surface 12B, in the Y direction. From the other viewpoint, the length of the side 37a and the bottom surface 10B in the Z direction is longer than the length of the side 36a and the bottom surface 10B, in the Y direction. For example, an angle formed by a plane parallel to the bottom surface 10B in the Y direction and the bottom plate 36 is equal to the angle θ5.

By inclining the bottom plates 34 and 36 as described above, the flow rate of the liquid flowing through the second flow path R2 increases as compared with a case where the bottom plates 34 and 36 are not inclined in the Y direction, similarly to the first flow path R1. The increase in the flow rate of the liquid flowing through the second flow path R2 enables the flow rate of the liquid flowing through the first tank T1 to increase. In addition, since the bottom plate 34 is inclined as described above, the floating matters can hardly be retained between the liquid level of the liquid stored in the first tank T1 and the bottom plate 34, similarly to the first flow path R1.

As shown in FIG. 9, the side 35b located on a side opposite to the side 35a which the side 35 includes is parallel to the X direction. A side 37b located on a side opposite to the side 37a which the side plate 37 includes is parallel to the X direction.

In FIG. 9, the liquid levels of the liquid stored in the first tank T1 during the operation of the filtration device 100 are indicated as a liquid level L1L and a liquid level L1H, respectively. These are similar to the liquid levels L1L and L1H shown in FIG. 5. In addition, a liquid level of the liquid stored in the second tank T2 is indicated as a liquid level L2H. The liquid level L2H substantially overlaps with the side 37b. When the first tank T1 and the second tank T2 are compared, the length of the liquid level L2H and the bottom surface 10B is longer than the length of the liquid level L1H and the bottom surface 10A.

In the first tank T1, a length D5 of the end portion R2b and the bottom surface 10A in the Z direction is shorter than a length D2 of the liquid level L1L and the bottom surface 10A (D5<D2). In other words, at least a part of the end portion R2b is immersed in the liquid during the operation of the filtration device 100. For this reason, a gap can hardly be formed between the end portion R2b and the liquid level.

The side 35b of the side plate 35 is more separated from the bottom surface 10A than the liquid level L1H, in the Z direction. A length D6 of the side 35b and the bottom surface 10A in the Z direction is longer than a length D4 of the liquid level L1H and the bottom surface D4 (D6>D4). The liquid stored in the first tank T1 during the operation of the filtration device 100 can hardly flow into the first portion R21 beyond the side plate 35. For this reason, the flow of the liquid flowing through the first portion R21 is hardly obstructed by the liquid stored in the first tank T1, and the flow rate of the liquid flowing through the first portion R21 hardly decreases.

In contrast, the length of the side 37b and the bottom surface 10B in the Z direction is substantially equal to the length of the liquid level L2H and the bottom surface 10B, in the second tank T2. When the liquid level of the liquid stored in the second tank T2 exceeds the liquid level L2H by the liquid flowing from the second processing device 2 into the second tank T2, during the operation of the filtration device 100, the liquid flows from the second tank T2 into the first tank T1 through the second flow path R2. For example, the liquid level of the liquid stored in the second tank T2 can be adjusted by adjusting the angle θ4.

For example, when the flow amount of flowing into the second tank T2 (processing amount of the second processing device 2) is 150 L per minute and the flow amount of flowing into the machine tool by the second pump P2 (processing amount of the first processing device 1) is 60 L per minute, the liquid of 90 L per minute flows (overflows) from the second tank T2 to the first tank T1. In addition, the flow amount of flowing from the second tank T2 into the first tank T1 changes during the operation and the suspension of the machine tool.

In this embodiment, since the downstream end portion R1b of the first flow path R1 and the downstream end portion R2b of the second flow path R2 are immersed in the liquid, the liquids flowing through the respective flow paths R1 and R2 can be made to smoothly flow into the first tank T1 at a predetermined flow rate. For this reason, the flow of the liquid flowing through each of the flow paths R1 and R2 can be utilized for the generation of a vortex flow in the first tank T1 and the increase in the flow rate of the liquid flowing into the first tank T1. Furthermore, since the end portions R1b and R2b are immersed in the liquid, foaming at the liquid level can be suppressed when the liquid flows from each of the flow paths R1 and R2 into the first tank T1.

In the first tank T1, the liquid flowing from the first flow path R1 flows into the first tank T1 along the first side surface 11A, the inclined surface S2, the fourth side surface 15A, the inclined surface S3, the second side surface 12A, the inclined surface S4, the third side surface 13A, the inclined surface S1, the first side surface 11A, and the inclined surface S2 in this order. The liquid flowing from the second flow path R2 also flows from the second side surface 12A into the first tank T1 along the surfaces in the same order. The liquid flowing from each of the flow paths R1 and R2 flows into the first tank T1 along each of the surfaces as described above, and a vortex flow is thereby generated.

Furthermore, since the liquid flows along the inclined surfaces S1 to S4 as well as the side surfaces 11A to 13A and 15A, the flow rate of the liquid flowing through the first tank T1 can be greatly increased as compared with a case where the inclined surfaces S1 to S4 are not provided.

Figure 12:
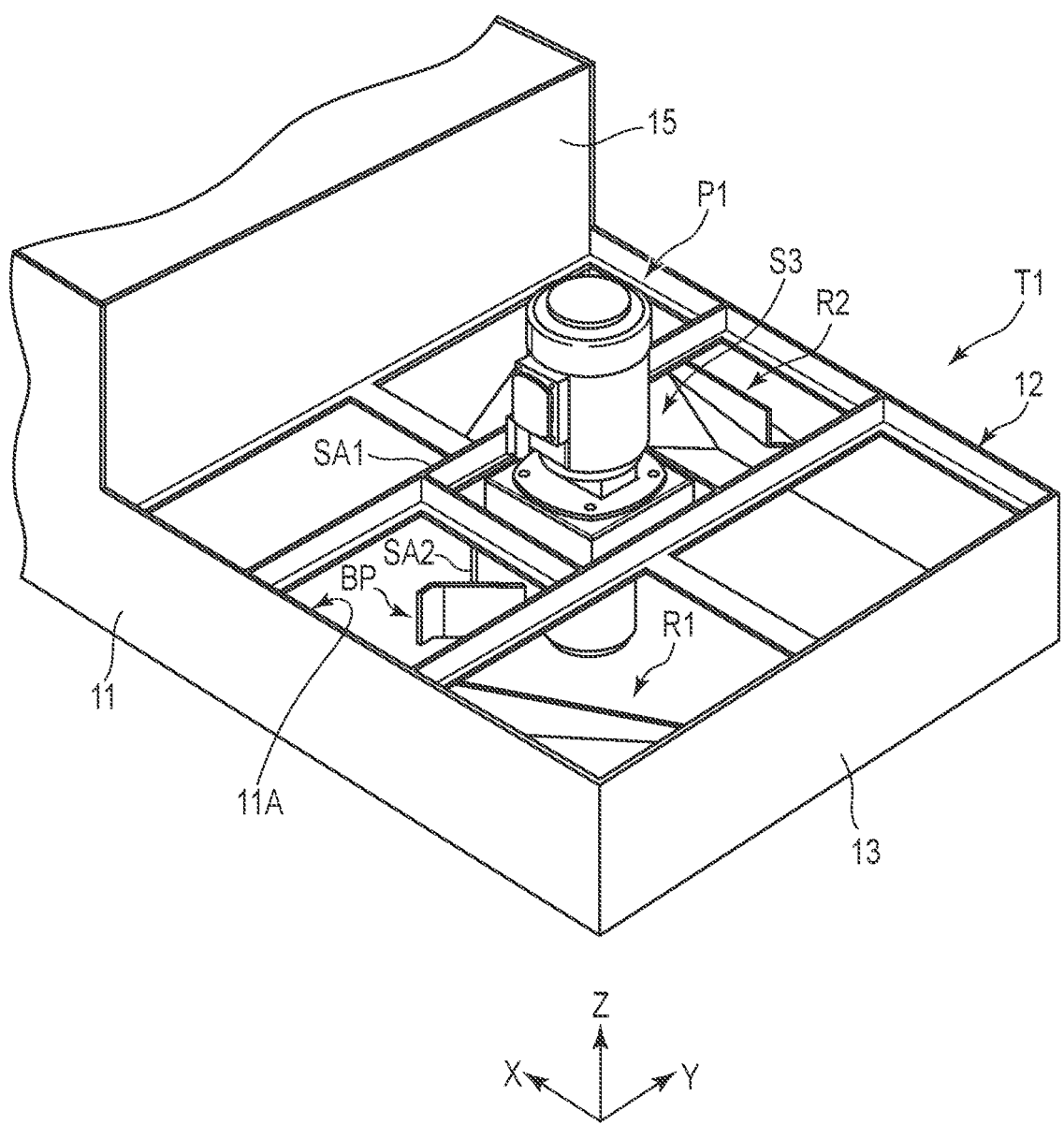
FIG. 12 is a schematic perspective view showing a first tank side of the filtration device.

FIG. 12 is a schematic perspective view showing the first tank T1 side of the filtration device 100. In FIG. 12, the first tank T1 side of the filtration device 100 is shown, and other portions are omitted. A first pump P1 is provided at the central portion CE of the first tank T1 by a support SA1 provided above the first tank T1. The support SA1 is formed of, for example, a steel material or a plate material. Furthermore, the support SA2 extends from the support SA1 toward the bottom surface 10A, and a plate material BP is attached to a distal end of the support SA2. The supports SA1 and SA2 are formed of, for example, a metal material, similarly to the bottom plate 10, the first side plate 11, and the like.

The plate material BP is provided between the first pump P1 and the first side surface 11A of the first side plate 11. The plate material BP is located more closely to the first pump P1 than the first side surface 11A. The position where the plate material BP is provided is not limited to the example illustrated, but may be between the first pump P1 and each of the side surfaces 12A, 13A, and 15A and the inclined surfaces S1 to S4. The position where the plate material BP is provided may be between the first pump P1 and each of the connecting portions J1 to J4.

Figure 13:
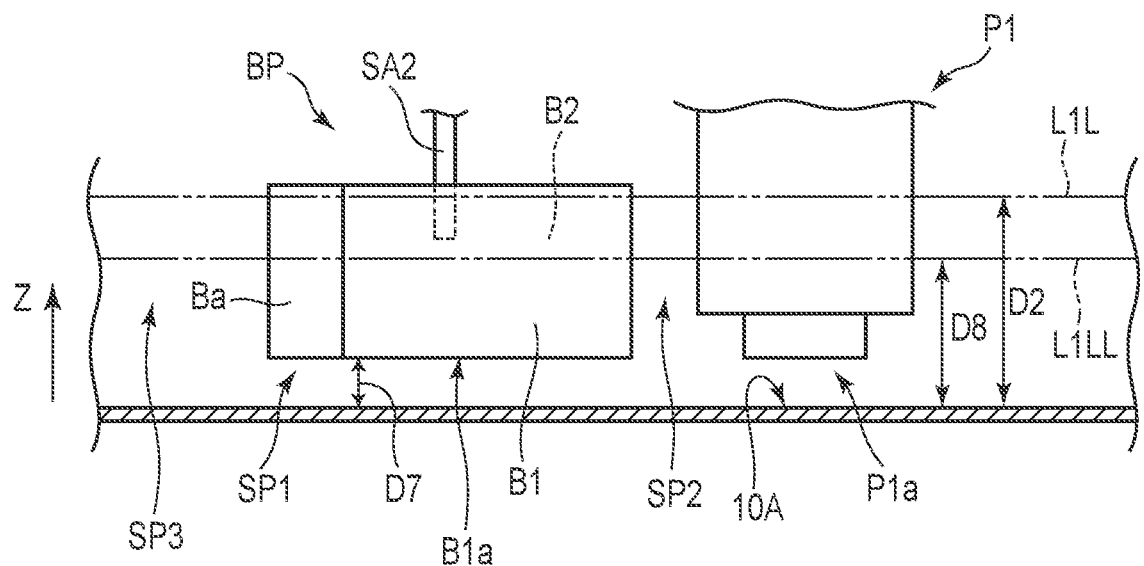
FIG. 13 is an enlarged view showing a vicinity of a plate material in FIG. 12.
Figure 14:
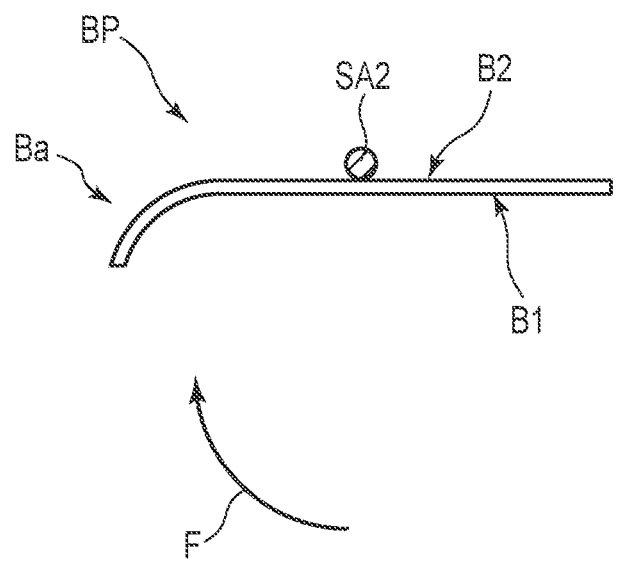
FIG. 14 is a schematic plan view showing a plate material in FIG. 13.

FIG. 13 is an enlarged view showing a vicinity of the plate material BP in FIG. 12. FIG. 14 is a schematic plan view showing the plate material BP in FIG. 13. In FIG. 14, an arrow F indicating the flow direction of the vortex flow is shown. In the example illustrated, the shape of the plate BP is a rectangular shape. The plate material BP includes a surface B1 and a surface B2 located on a side opposite to the surface B1. The plate material BP is provided in the first tank T1 such that the surface B1 intersects with the flow direction of the vortex flow.

In the example illustrated, the plate material BP is provided parallel to the Z direction. The support SA2 is connected to the surface B2. The support SA2 is, for example, a rod-shaped member, and is a round bar in the example illustrated. The plate material BP is formed of, for example, a metal material, similarly to the bottom plate 10 and the first side plate 11 forming the tank portion TA, and the like.

In the plate material BP, an end portion Ba on the first side 11A side (the side separated from the first pump P1) is bent. In the example shown in FIG. 14, the end portion Ba is bent into an R shape. From the other viewpoint, the plate material BP includes a portion having a curved surface located on the first side surface 11A side and a portion having a flat surface. The end portion Ba corresponds to, for example, the portion having the curved surface. The plate material BP is provided such that the end portion Ba is directed in a direction opposite to the flow direction (arrow F) of the vortex flow.

As shown in FIG. 13, a gap SP1 is formed between the plate material BP and the bottom surface 10A, a gap SP2 is formed between the plate material BP and the first pump P1, and a gap SP3 is formed between the plate material BP and the first side surface 11A. From the other viewpoint, the plate material BP is not in contact with the bottom surface 10A, the first pump P1, or the first side surface 11A. The liquid stored in the first tank T1 can flow around the plate material BP.

In FIG. 13, the liquid level of the liquid stored in the first tank T1 during the operation of the filtration device 100 is indicated by a liquid level L1L. The liquid level is similar to the liquid level L1L shown in FIG. 5 and FIG. 9. In addition, in FIG. 13, a liquid level necessary for the first pump P1 not to suck air (air) during the operation is indicated by a liquid level L1LL.

A length D7 between the side B1$a$ on the bottom surface 10A side and the bottom surface 10A, in the plate material BP, is shorter than the length D2 between the liquid level L1L and the bottom surface 10A (D7<D2). In other words, at least a part of the plate material BP is immersed in the liquid during the operation of the filtration device 100. The length D7 between the side B1$a$ and the bottom portion 10A is shorter than a length D8 between the liquid level L1LL and the bottom surface 10A (D7<D8). When the liquid level of the first tank T1 is the liquid level L1H, the entire plate material BP is immersed in the liquid, which is not shown in the figure. In addition, the length D8 between the liquid level L1LL and the bottom portion 10A is shorter than the length D2 between the liquid level L1L and the bottom surface 10A (D8<D2).

When the flow rate of the liquid flowing into the first tank T1 increases and a vortex flow is generated, the liquid level of the liquid stored in the first tank T1 may changes in a conical shape. At this time, the height of the liquid level in the first tank T1 is smaller from the side of each of the side surfaces 11A to 13A and 15A toward the central portion CE side (first pump P1 side). When the liquid level on the first pump P1 side is extremely lowered, this may cause the first pump P1 to such air (air) during the operation (air entrainment). The change in the liquid level in the first tank T1 as described above can be suppressed by providing the plate material BP.

Since the gaps SP1 to SP3 are formed around the plate material BP, the flow of the liquid flowing on the bottom surface 10A side of the first tank T1 is hardly obstructed. For this reason, the foreign matters in the first tank T1 can hardly be retained around the plate material BP. Even when the plate material BP is provided, a centripetal force acting on the foreign matters of the vortex flow is hardly hindered.

Furthermore, the flow of the liquid directed toward the first pump P1 side along the end portion Ba is formed on the surface B1 side of the plate material BP by bending the end portion Ba. For this reason, the foreign matters located on the surface B1 side tend to flow toward the first pump P1 side. In addition, since the liquid also flows along the end portion Ba on the surface B2 side of the plate material BP, the liquid level on the surface B2 side can be suppressed from becoming lower than the liquid level on the surface B1 side as compared with a case where the end portion Ba is not bent.

Figure 15:
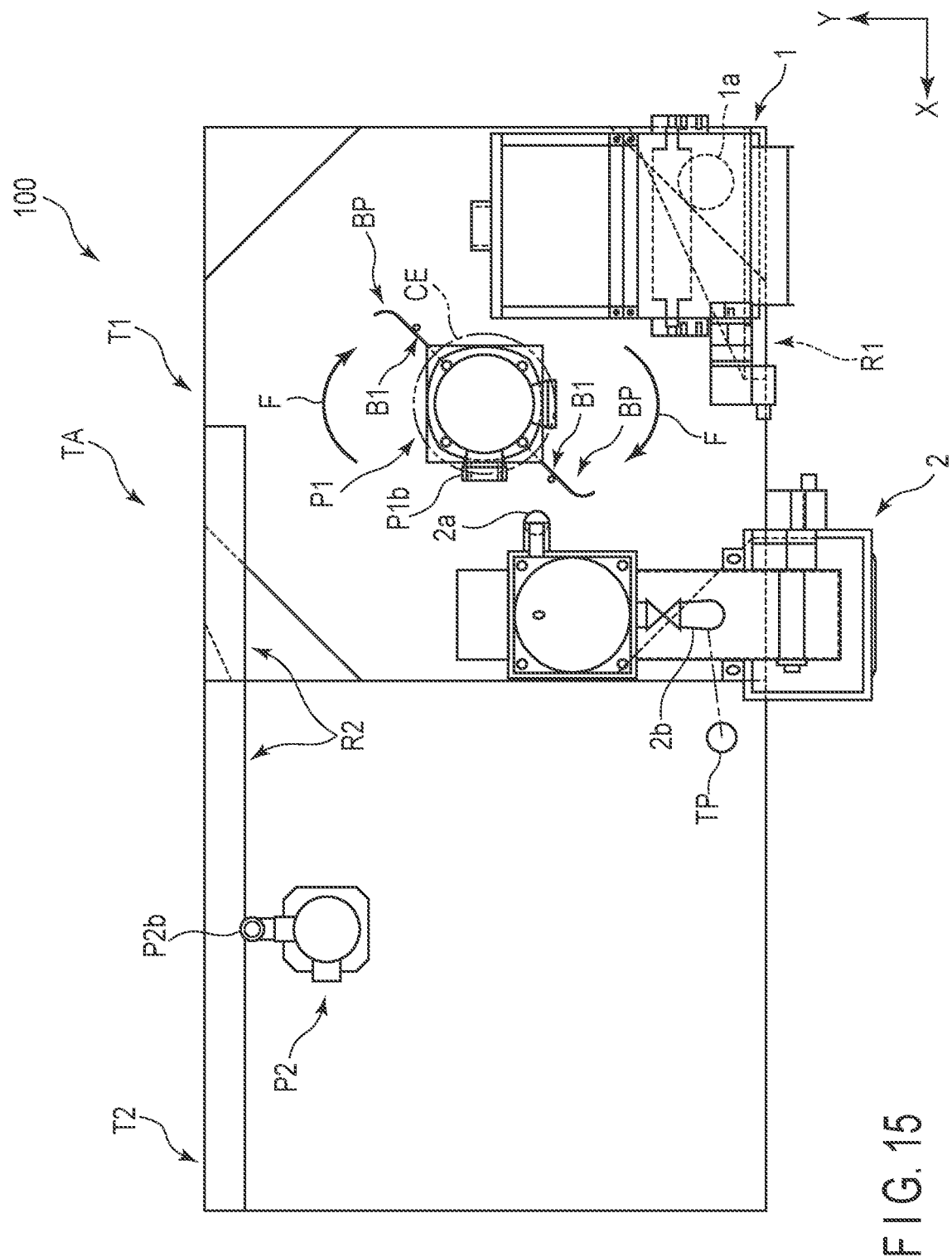
FIG. 15 is a schematic plan view showing another example of the plate material provided in a first tank.

FIG. 15 is a schematic plan view showing another example of the plate material BP provided in the first tank T1. In FIG. 15, two plate materials BP are provided in the first tank T1. When the processing amount of the filtration device 100 is large, two plate materials BP may be provided as shown in the figure.

Even when the processing amount of the filtration device 100 is large and the flow rate of the liquid flowing through the first tank T1 is high, the same advantages as those described with reference to FIG. 13 and FIG. 14 can be obtained by providing two plate materials BP. As shown in FIG. 15, the two plate materials BP are desirably provided at positions symmetrical with respect to the first pump P1 (central portion of the vortex flow) at 180 degrees. The end portion Ba of the plate material BP faces in the direction opposite to the flow direction of the vortex flow (arrow F).

According to the above-described embodiment, the foreign matters contained in the liquid discharged from the machine tool can be efficiently processed. In other words, since a uniform fast flow can be formed in the liquid stored in the first tank T1, retention and accumulation of foreign matters can hardly occur in the first tank T1, and most of the foreign matters in the first tank T1 can be collected in the central portion CE by the generated vortex flow.

Since the foreign matters in the first tank T1 are collected in the central portion CE and the collected foreign matters are reliably processed in the second processing device 2 together with the liquid, the foreign matters contained in the liquid can be efficiently processed by the filtration device 100. Furthermore, since most of the foreign matters in the first tank T1 are discharged to the second processing device 2 by the first pump P1, the foreign matter can hardly form a muddy solid (sludge) or the like in the first tank T1, and the burden of processing the foreign matters due to cleaning or the like during inspection can be reduced.

In addition, since foaming on the liquid level is suppressed by immersing the downstream end portion R1$b$ of the first flow path R1 and the downstream end portion R2$b$ of the second flow path R2 in the liquid when the liquid flows into the first tank T1, processing the foreign matters can hardly be hindered by the floating matter such as bubbles on the liquid level.

Even when the flow rate of the liquid flowing in the first tank T1 increases, air entrainment hardly occurs during the operation of the first pump P1 by providing the plate material BP in the first tank T1 and the liquid can be discharged from the first tank T1 by the first pump P1.

Furthermore, if the first tank T1 has a square shape, the capacity of the first tank T1 cannot only be increased but the liquid containing the foreign matters can also be processed as compared with a tank having a cylindrical shape.

In addition to the above, various desirable advantages can be obtained from the embodiment. The configuration of the filtration device 100 according to this embodiment is merely an example. The filtration device 100 may further comprise, for example, other configurations such as an oil recovery device for recovering oil from a liquid level of the liquid stored in the second tank T2 or a temperature regulator (cooler) for adjusting a liquid temperature.

Figure 16:
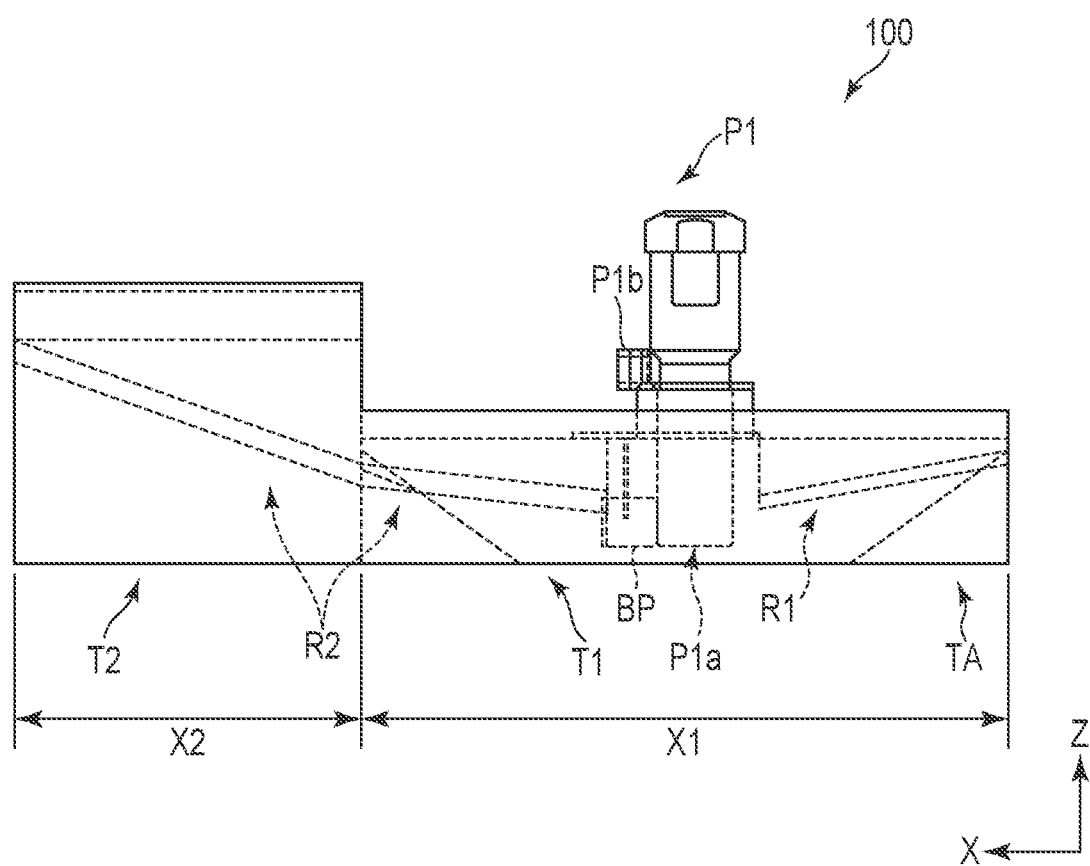
FIG. 16 is a schematic side view showing another example of the tank portion.

In addition, the shape of the tanks is not limited to the above example. FIG. 16 is a schematic side view showing another example of the tank portion TA. FIG. 17 is a schematic plan view showing the other example of the tank portion TA. For example, as shown in FIG. 16 and FIG. 17, the first tank T1 and the second tank T2 may have a rectangular shape in planar view. For example, when the length of the short side is set to 1, in the first tank T1, the length of the long side is 1 or more and 1.3 or less.

A ratio of the length of the short side to the length of the long side in the first tank T1 is, for example, 1:1.3. In this case, the ratio of the length X1 in the X direction to the length Y1 in the Y direction may be 1.3:1 (X1:Y1=1.3:1), and the ratio of the length X1 in the X direction to the length Y1 in the Y direction may be 1:1.3 (X1:Y1=1:1.3).

Each of the first tank T1 and the second tank T2 may have a rectangular shape or either of them may have a rectangular shape. Even when the first tank T1 has a rectangular shape, the first pump P1 is located at the central portion CE of the first tank T1. As shown in the figure, the length X1 of the first tank T1 in the X direction may be longer than the length X2 of the second tank T2 in the X direction.

Figure 18:
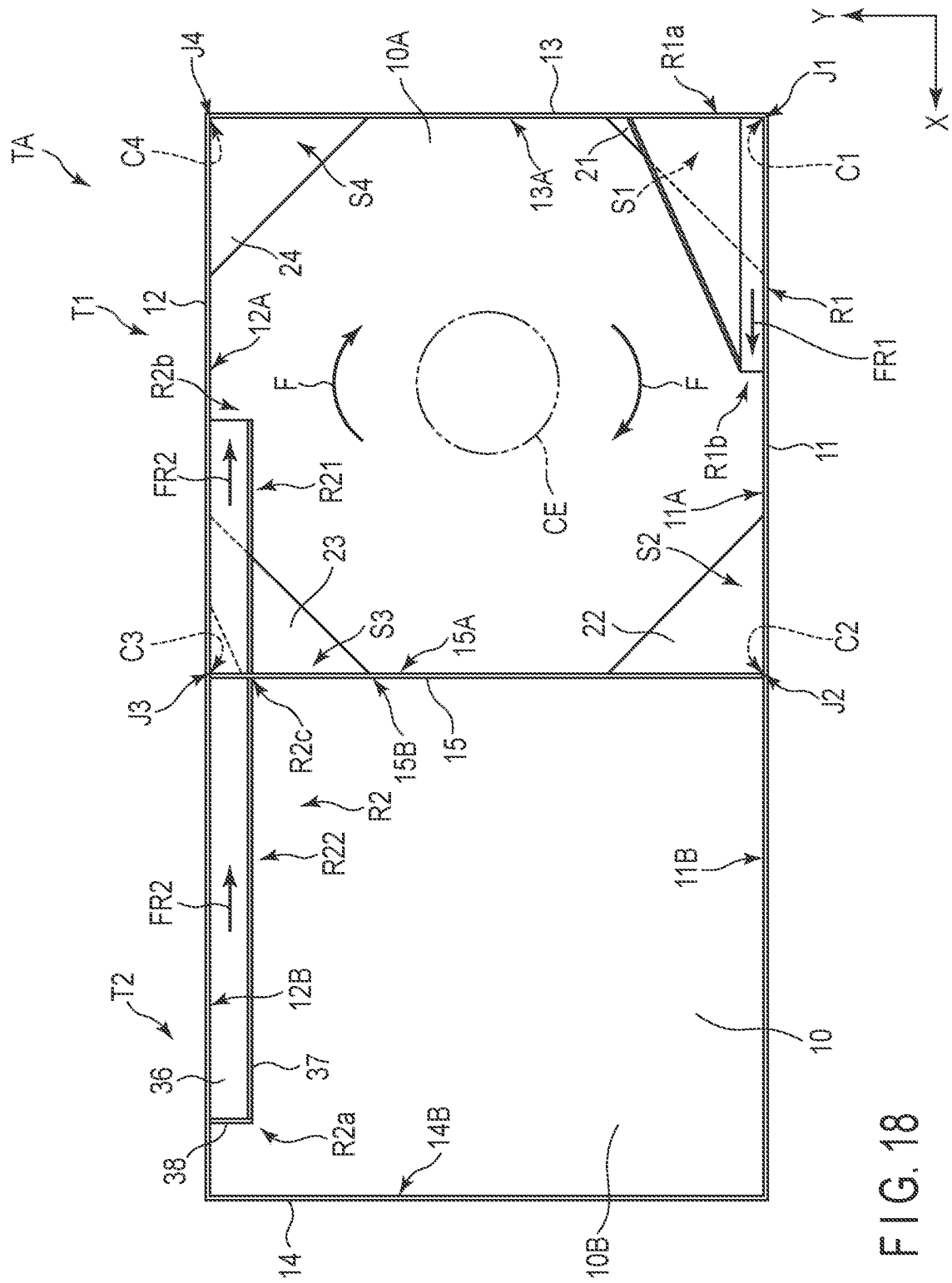
FIG. 18 is a schematic plan view showing another example of the second flow path.

FIG. 18 is a schematic plan view showing another example of the second flow path R2. A gap may be formed between the end portion R2a and the eighth side surface 14B, at the second portion R22 of the second flow path R2. In this case, a side plate 38 parallel to the fourth side plate 14 may be further provided at the end portion R2a. For example, the end portion R2a is located more closely to the fourth side plate 14 than the partition plate 15 in the X direction.

Figure 19:
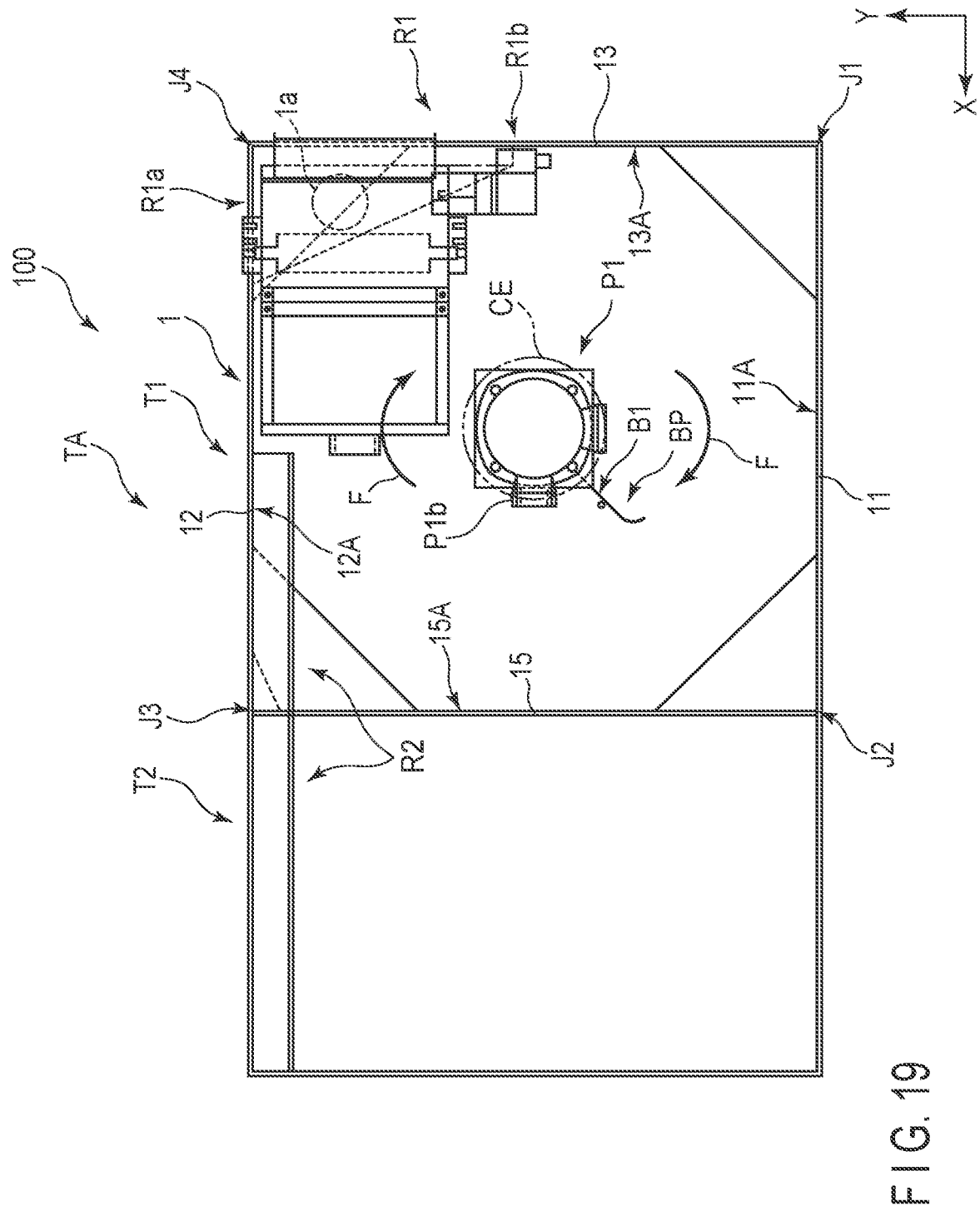
FIG. 19 is a plan view showing another example of the position where a first processing device is provided in the first tank.

In addition, the position of the first processing device 1 is not limited to the above-described example. FIG. 19 is a plan view showing another example of the position where the first processing device 1 is provided, in the first tank T1. In FIG. 19, the first processing device 1 is located on the connecting portion J4 side of the first tank T1. For example, the first processing device 1 overlaps the plate material 24 in the Z direction.

In this case, the first flow path R1 is provided along the third side surface 13A of the third side plate 13 in the first tank T1. The end portion R1a of the first flow path R1 is located on the second side plate 12 side, and the end portion R1b is located on the first side plate 11 side. The end portion R1a is connected to the second side surface 12A, and no gap is formed between the end portion R1a and the second side surface 12A. The liquid flowing through the first flow path R1 flows from the second side surface 12A side toward the first side surface 11A side.

Figure 20:
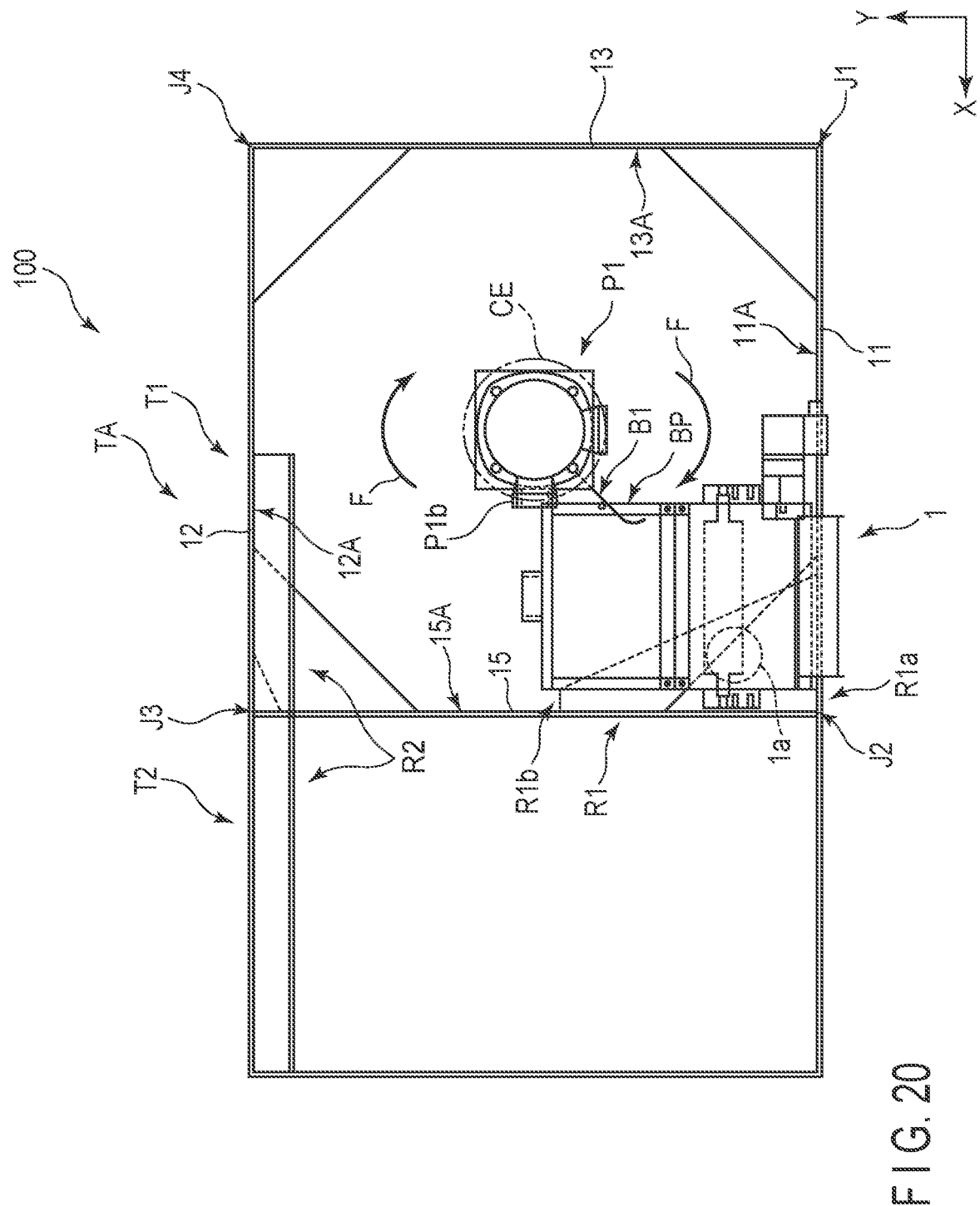
FIG. 20 is a plan view showing yet another example of the position where the first processing device is provided in the first tank.

FIG. 20 is a plan view showing yet another example of the location where the first processing device 1 is provided, in the first tank T1. In FIG. 20, the first processing device 1 is located on the connecting portion J2 side of the first tank T1. For example, the first processing device 1 overlaps with the plate material 22 in the Z direction. In this case, the first flow path R1 is provided along the fourth side surface 15A of the partition plate 15 in the first tank T1.

The end portion R1a of the first flow path R1 is located on the first side plate 11 side, and the end portion R1b is located on the second side plate 12 side. The end portion R1a is connected to the first side surface 11A, and no gap is formed between the end portion R1a and the first side surface 11A. The liquid flowing through the first flow path R1 flows from the first side surface 11A side toward the second side surface 12A side.

In the examples shown in FIG. 19 and FIG. 20, the direction of flow of the liquid flowing through the first flow path R1 intersects the direction of flow of the liquid flowing through the second flow path R2. In the examples shown in FIG. 19 and FIG. 20, a vortex flow is also generated in the first tank T1 due to the flow of the liquid from the first flow path R1 and the second flow path R2.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A device comprising:
a tank portion including a first tank to which a liquid containing foreign matters flows; and
a pump provided at a central portion of the first tank to discharge the liquid stored in the first tank,
the first tank having
a bottom surface,
a first side surface, a second side surface, a third side surface, and a fourth side surface, the first to fourth side surfaces connected to the bottom surface,
a first corner, a second corner, a third corner, and a fourth corner, each of the first to fourth corners connected to the bottom surface and two of the first to fourth side surfaces,
a first inclined surface, a second inclined surface, a third inclined surface, and a fourth inclined surface, and each of the first to fourth inclined surfaces covering one of the first to fourth corners,
a first flow path, and
a second flow path,
the first flow path having a first bottom plate provided along the first side surface,
the second flow path having a second bottom plate provided along the second side surface, opposed to the first side surface,
each of the first to fourth inclined surfaces being inclined so that a distance from the bottom surface toward each of first to forth inclined surfaces is decreasing from a connecting portion to which two of the first to fourth side surfaces are connected toward the central portion,
a flow direction of the liquid flowing through the second flow path being opposite to a flow direction of the liquid flowing through the first flow path,
a vortex flow being generated in the first tank by the liquid flowing through the first flow path and the second flow path to collect the foreign matters in the central portion of the first tank and discharge the foreign matters by the pump.

2. The device of claim 1, wherein
each of the first to fourth inclined surfaces is connected to the bottom surface and two of the first to fourth side surfaces.

3. The device of claim 1, wherein
each of the first to fourth inclined surfaces is formed of a plate material.

4. The device of claim 1, further comprising:
a first processing device which processes the liquid before flowing into the first tank, wherein
the liquid processed by the first processing device flows to the first tank through the first flow path, and
the first bottom plate is inclined so that a distance from the bottom surface to the first bottom plate is decreasing from an upstream side located on an outlet side of the first processing device toward a downstream side located on the bottom surface side, and so that the distance is increasing from a first side connected to the first side surface toward a second side opposed to the first side.

5. The device of claim 4, further comprising:
a second processing device connected to the pump to process the liquid discharged from the pump, wherein
the tank portion includes a second tank to which the liquid processed in the second processing device flows,
the liquid processed by the second processing device flows to the first tank through the second flow path, and
the second bottom plate is inclined so that a distance from the bottom surface to the second bottom plate is decreasing from an upstream side located on the second tank side toward a downstream side located on the bottom surface side, and so that the distance is increasing from a third side connected to the second side surface toward a fourth side opposed to the third side.

6. A device comprising:
a first processing device which processes a liquid containing foreign matters;
a tank portion including a first tank to which the liquid processed by the first processing device flows; and
a pump provided at a central portion of the first tank to discharge the liquid stored in the first tank,
the first tank including
a bottom surface,
a first side surface, a second side surface, a third side surface, and a fourth side surface, the first to fourth side surfaces connected to the bottom surface,
a first flow path which is provided along the first side surface and to which the liquid processed in the first processing device flows, and
a second flow path which is provided along the second side surface, opposed to the first side surface,
a flow direction of the liquid flowing through the second flow path being opposite to a flow direction of the liquid flowing through the first flow path,
the first flow path having a first bottom plate provided along the first side surface,
the first bottom plate being inclined so that a distance from the bottom surface to the first bottom plate is decreasing from an upstream side located on an outlet side of the first processing device toward a downstream side located on the bottom surface side, and so that the distance is increasing from a first side connected to the first side surface toward a second side opposed to the first side, and a vortex flow being generated in the first tank by the liquid flowing through the first flow path and the second flow path to collect the foreign matters in the central portion of the first tank and discharge the foreign matters by the pump.

7. The device of claim 6, wherein
an end portion located on the downstream side of the first flow path is immersed in the liquid stored in the first tank during operation of the pump.

8. The device of claim 6, further comprising:
a second processing device connected to the pump to process the liquid discharged from the pump, wherein
the tank portion includes a second tank to which the liquid processed in the second processing device flows,
the liquid processed by the second processing device flows to the first tank through the second flow path,
the second flow path has a second bottom plate provided along the second side surface, and
the second bottom plate is inclined so that a distance from the bottom surface to the second bottom plate is decreasing from an upstream side located on the second tank side toward a downstream side located on the bottom surface side, and so that the distance is increasing from a third side connected to the second side surface toward a fourth side opposed to the third side.

9. The device of claim 8, wherein
an end portion located on the downstream side of the second flow path is immersed in the liquid stored in the first tank during operation of the pump.

10. The device of claim 1, wherein
the first tank further includes a plate material,
a distance between the plate material and the pump is smaller than a distance between the plate material and one of the first to forth side surface,
the plate material includes a surface intersecting a flow direction of the vortex flow,
gaps are formed between the plate material and the pump, between the plate material and one of the first to fourth side surfaces, and between the plate material and the bottom surface, respectively, and
at least a part of the plate material is immersed in the liquid stored in the first tank during operation of the pump.

11. The device of claim 10, wherein
in the plate material, an end portion on one of the first to fourth side surfaces is bent.

* * * * *

UNITED STATES PATENT AND TRADEMARK OFFICE
CERTIFICATE OF CORRECTION

PATENT NO. : 12,440,783 B2
APPLICATION NO. : 17/993780
DATED : October 14, 2025
INVENTOR(S) : Makoto Tashiro Page 1 of 1

It is certified that error appears in the above-identified patent and that said Letters Patent is hereby corrected as shown below:

On the Title Page

Please insert the following new section:
--(30)   Foreign Application Priority Data:
Feb. 25, 2021   (JP) ......................... 2021-028923--

Signed and Sealed this
Thirtieth Day of December, 2025

John A. Squires
*Director of the United States Patent and Trademark Office*